(12) United States Patent
Takizuka et al.

(10) Patent No.: US 8,810,563 B2
(45) Date of Patent: Aug. 19, 2014

(54) TRANSMITTING APPARATUS, STEREOSCOPIC IMAGE DATA TRANSMITTING METHOD, RECEIVING APPARATUS, AND STEREOSCOPIC IMAGE DATA RECEIVING METHOD

(75) Inventors: Hiroshi Takizuka, Tokyo (JP); Koichi Takenaka, Tokyo (JP); Takayuki Shinohara, Tokyo (JP)

(73) Assignees: Sony Corporation (JP); Sony Computer Entertainment Inc. (JP)

( * ) Notice: Subject to any disclaimer, the term of this patent is extended or adjusted under 35 U.S.C. 154(b) by 476 days.

(21) Appl. No.: 12/798,993

(22) Filed: Apr. 15, 2010

(65) Prior Publication Data

US 2010/0271461 A1 Oct. 28, 2010

(30) Foreign Application Priority Data

Apr. 22, 2009 (JP) ................................ P2009-104359

(51) Int. Cl.
*G06F 17/00* (2006.01)
*H04N 13/00* (2006.01)

(52) U.S. Cl.
USPC ............................................. 345/418; 348/42

(58) Field of Classification Search
None
See application file for complete search history.

(56) References Cited

U.S. PATENT DOCUMENTS

| 2005/0146521 | A1* | 7/2005 | Kaye et al. ..................... 345/419 |
| 2005/0251834 | A1* | 11/2005 | Hulbig ............................. 725/78 |
| 2006/0165311 | A1* | 7/2006 | Watson .......................... 382/286 |
| 2006/0203085 | A1* | 9/2006 | Tomita ............................ 348/51 |
| 2007/0255480 | A1* | 11/2007 | Southall et al. .................. 701/96 |
| 2008/0074444 | A1* | 3/2008 | Morikawa et al. ............ 345/660 |
| 2008/0080852 | A1* | 4/2008 | Chen et al. ..................... 396/324 |
| 2008/0150936 | A1* | 6/2008 | Karman ......................... 345/419 |
| 2009/0096863 | A1* | 4/2009 | Kim et al. ........................ 348/42 |
| 2010/0045780 | A1* | 2/2010 | Kwon et al. ..................... 348/51 |
| 2010/0110069 | A1* | 5/2010 | Yuan ............................. 345/419 |
| 2010/0134602 | A1* | 6/2010 | Inaba .............................. 348/58 |
| 2010/0156627 | A1* | 6/2010 | Kennedy ................. 340/539.16 |
| 2010/0238272 | A1* | 9/2010 | Cameron et al. ................ 348/47 |

FOREIGN PATENT DOCUMENTS

| JP | 7059120 | 3/1995 |
| JP | 7255068 | 10/1995 |
| JP | 2002095018 A | 3/2002 |
| JP | 2004-180069 A | 6/2004 |
| JP | 2004084560 A | 9/2004 |

(Continued)

OTHER PUBLICATIONS

High-Definition Multimedia Interface Specification Version 1.3a, Nov. 10, 2006, pp. ii-156 and Supplement 1 Consumer Electronics Control (CEC), pp. ii-97.

*Primary Examiner* — Aaron M Richer
*Assistant Examiner* — Anh-Tuan V Nguyen
(74) *Attorney, Agent, or Firm* — Lerner, David, Littenberg, Krumholz & Mentlik, LLP

(57) ABSTRACT

There is provided a transmitting apparatus including an image data output unit that outputs stereoscopic image data including left-eye image data and right-eye image data for displaying a stereoscopic image, a data transmitting unit that transmits the stereoscopic image data output from the image data output unit to an external device through a transmission path, and an information acquisition unit that acquires information related to a screen size from the external device through the transmission path. The image data output unit outputs the stereoscopic image data suited for the screen size obtained from the information acquired by the information acquisition unit.

16 Claims, 30 Drawing Sheets

(56) References Cited

FOREIGN PATENT DOCUMENTS

| | | |
|---|---|---|
| JP | 2007-336518 A | 12/2007 |
| JP | 2008-085461 A | 4/2008 |
| JP | 2008158595 A | 7/2008 |
| JP | 2009025343 A | 2/2009 |
| JP | 2010-088092 A | 4/2010 |
| JP | 2012089906 A | 5/2012 |

* cited by examiner

FIG.2A            FIG.2B
EXAMPLE OF DISPLAY SCHEME OF
STEREOSCOPIC IMAGE
FIELD-BY-FIELD LR SWITCHING      LINE-BY-LINE LR SWITCHING
(FIELD SEQUENCE SCHEME)        (PHASE DIFFERENCE PLATE SCHEME)
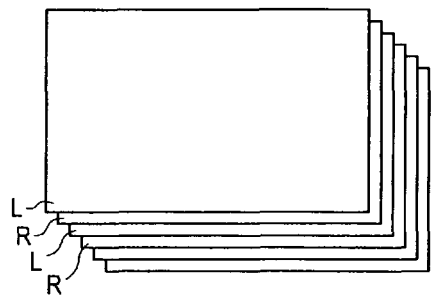
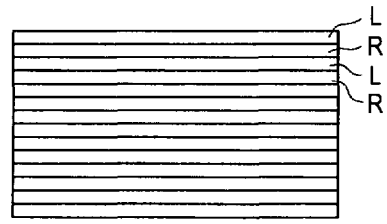

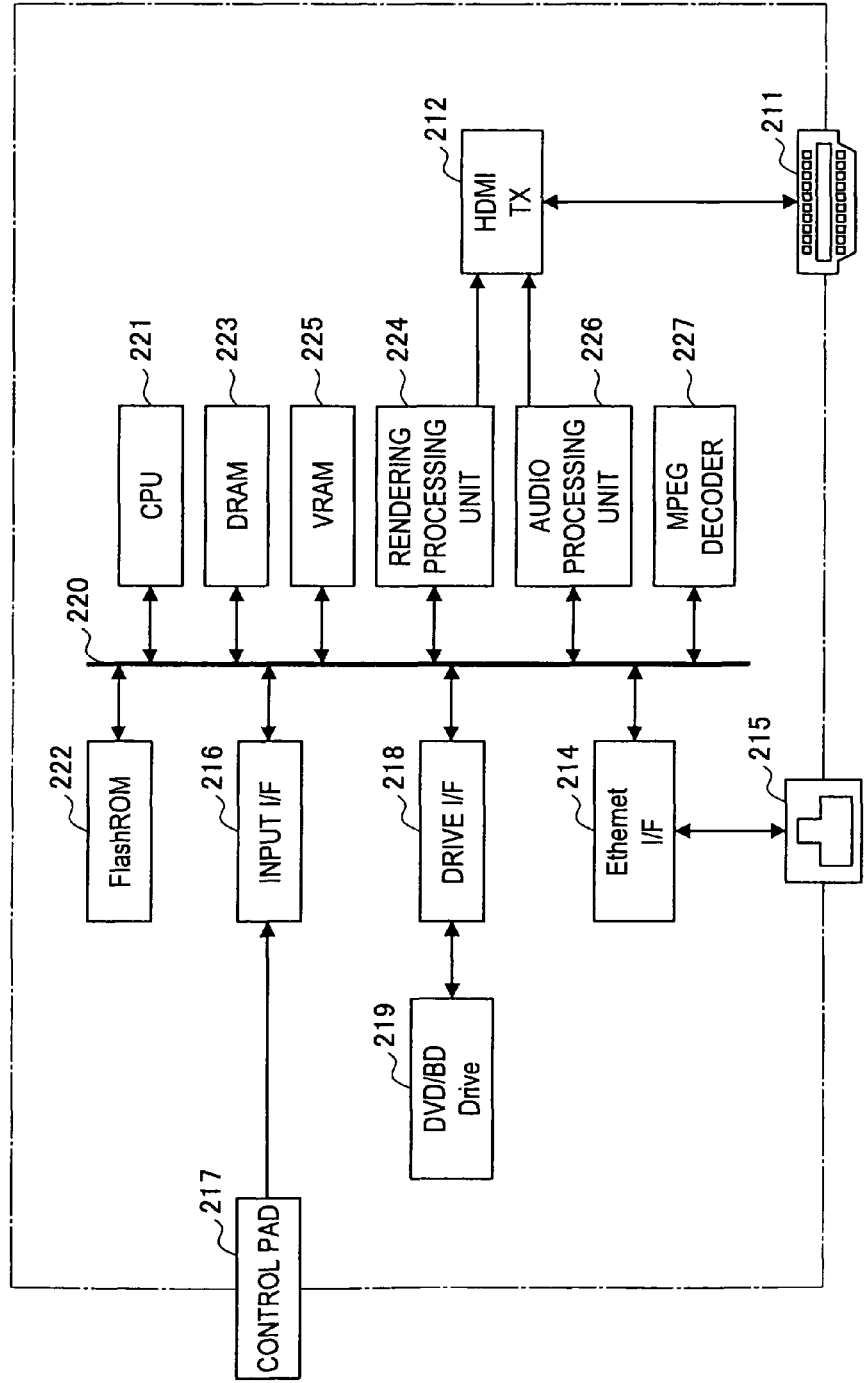

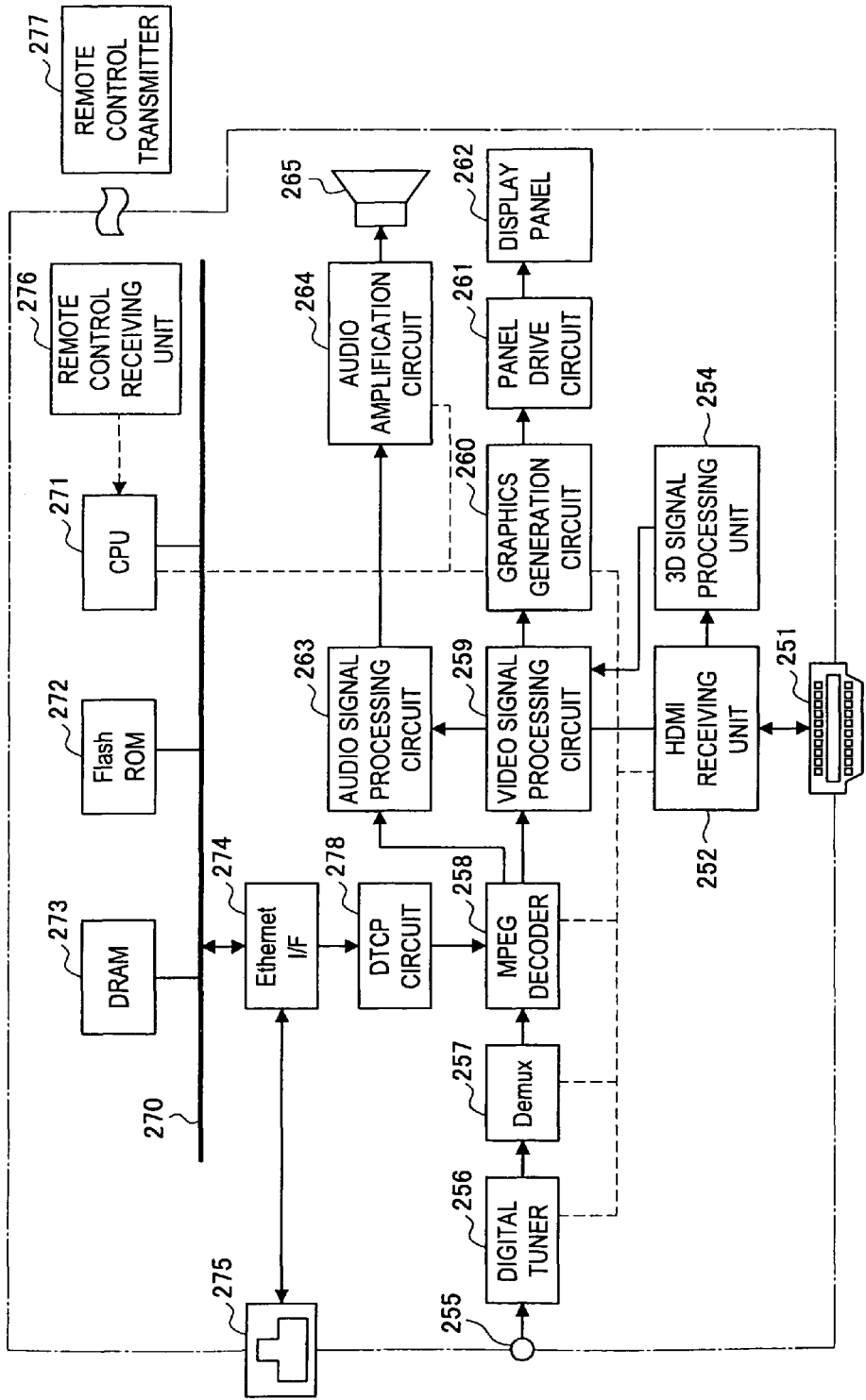

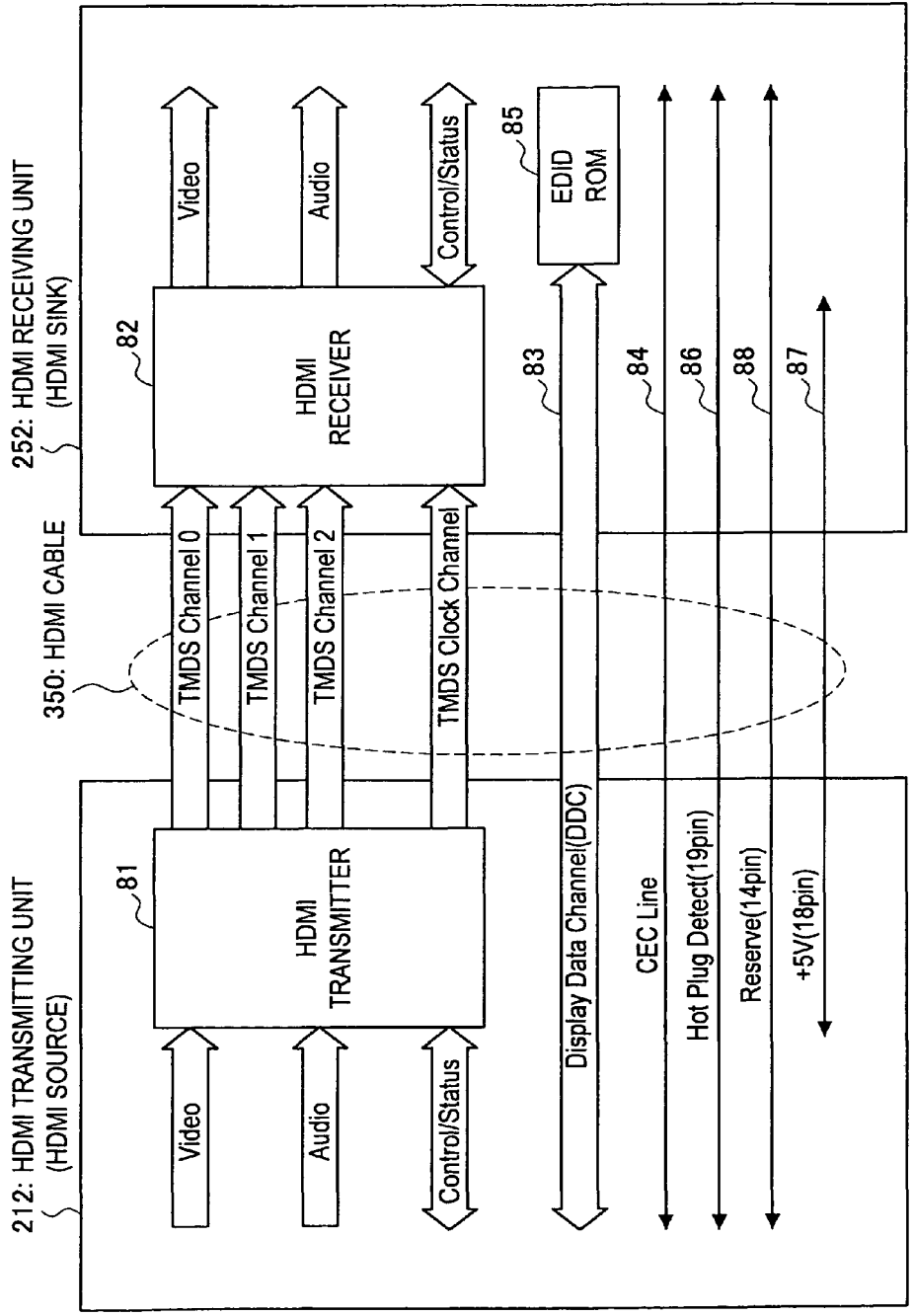

FIG.8

HDMI PIN-OUT(Type-A)

| PIN | Signal Assignment | PIN | Signal Assignment |
|---|---|---|---|
| 1 | TMDS Data2+ | 2 | TMDS Data2 Shield |
| 3 | TMDS Data2- | 4 | TMDS Data1+ |
| 5 | TMDS Data1 Shield | 6 | TMDS Data1- |
| 7 | TMDS Data0+ | 8 | TMDS Data0 Shield |
| 9 | TMDS Data0- | 10 | TMDS Clock+ |
| 11 | TMDS Clock Shield | 12 | TMDS Clock- |
| 13 | CEC | 14 | Reserved(N.C. on device)/Ether+ |
| 15 | SCL | 16 | SDA |
| 17 | DDC/CEC Ground | 18 | +5V Power |
| 19 | Hot Plug Detect/Ether- | | |

FIG.9
EXAMPLE OF STEREOSCOPIC
IMAGE DATA
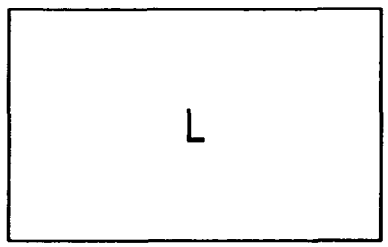 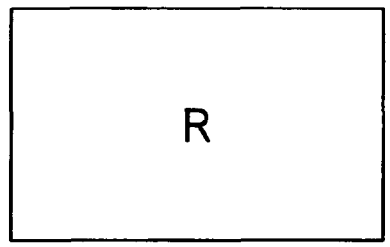
1920x1080p    1920x1080p

EXAMPLE OF TMDS TRANSMISSION DATA
IN THIRD TRANSMISSION SCHEME

FIG.16

EXAMPLE OF VIDEO DATA IN Short Video Descriptor REGION

| Byte# | 7 | 6 | 5 | 4 | 3 | 2 | 1 | 0 |
|---|---|---|---|---|---|---|---|---|
| 0 | Video tag code (=2) | | | | Length (=L) | | | |
| 1 | CEA Short Video Descriptor 1 = &H85 (1920x1080i 60Hz 16:9 Native Mode) | | | | | | | |
| 2 | CEA Short Video Descriptor 2 = &H02 (720x480i 60Hz 4:3) | | | | | | | |
| 3 | CEA Short Video Descriptor 3 = &H03 (720x480p 60Hz 16:9) | | | | | | | |
| 4 | CEA Short Video Descriptor 4 = &H04 (1280x720p 60Hz 16:9) | | | | | | | |
| 5 | CEA Short Video Descriptor 5 = &H16 (1920x1080p 60Hz 16:9) | | | | | | | |
| 6...L-1 | ... | | | | | | | |
| L | CEA Short Video Descriptor L = &H46 (1920x1080i 120Hz 16:9) | | | | | | | |

FIG.17

EXAMPLE OF DATA STRUCTURE IN Vendor Specific REGION

| Byte# | 7 | 6 | 5 | 4 | 3 | 2 | 1 | 0 |
|---|---|---|---|---|---|---|---|---|
| 0 | Vender-specific tag code (=3) | | | Length (=N) | | | | |
| 1 | 24-bit IEEE Registration Identifier (0x000C03) (least significant byte first) | | | | | | | |
| 2 | | | | | | | | |
| 3 | | | | | | | | |
| 4 | A | | | | B | | | |
| 5 | C | | | | D | | | |
| 6 | Supports_AI | DC_48bit | DC_36bit | DC_30bit | DC_Y444 | Rsvd(0) | Rsvd(0) | DVI_Dual |
| 7 | Max_TMDS_Clock | | | | | | | |
| 8 | Latency_Fields_Present | I_Latency_Fields_Present | 3D_Fields_Present | Rsvd(0) | Rsvd(0) | Rsvd(0) | Rsvd(0) | Rsvd(0) |
| 9 | Video_Latency | | | | | | | |
| 10 | Audio_Latency | | | | | | | |
| 11 | Interlaced_Video_Latency | | | | | | | |
| 12 | Interlaced_Audio_Latency | | | | | | | |
| 13 | Screen_Size | | | | | | | |
| 14...N | Reserved (0) | | | | | | | |

FIG.25
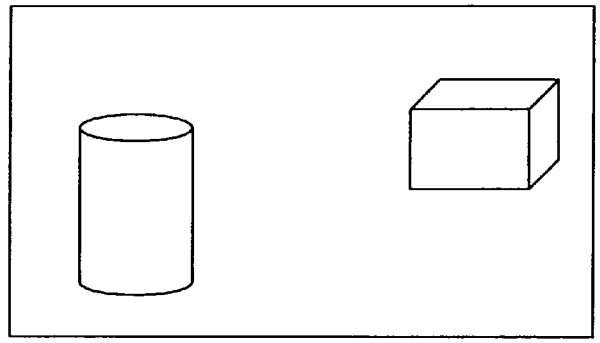
DEPTH INFORMATION
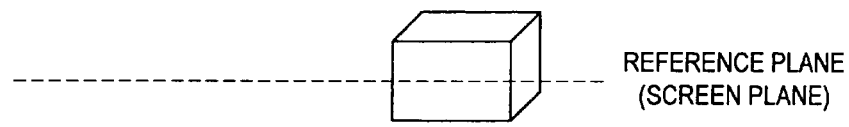
REFERENCE PLANE
(SCREEN PLANE)
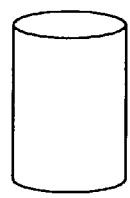
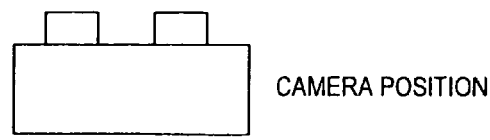
CAMERA POSITION

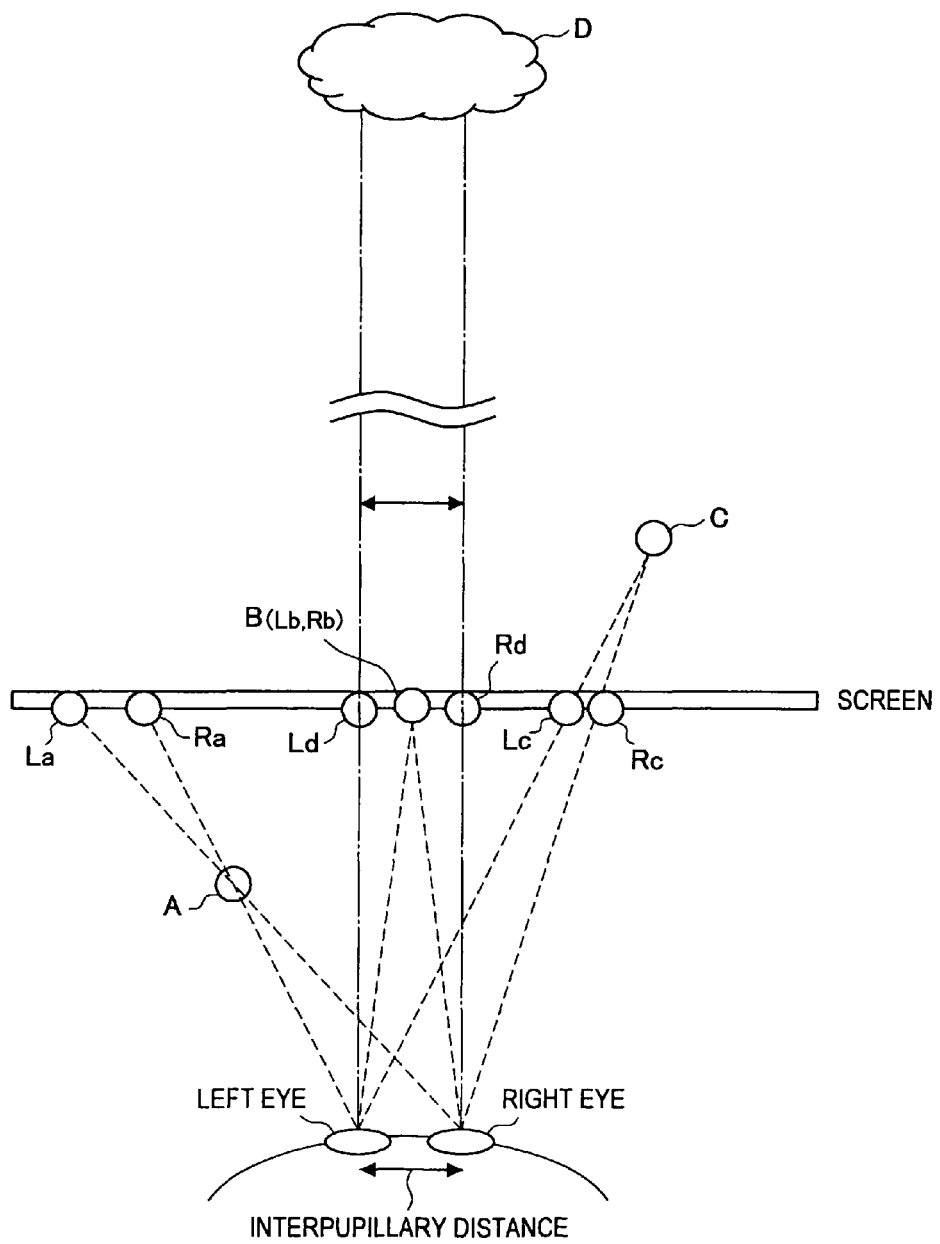

TRANSMITTING APPARATUS, STEREOSCOPIC IMAGE DATA TRANSMITTING METHOD, RECEIVING APPARATUS, AND STEREOSCOPIC IMAGE DATA RECEIVING METHOD

CROSS-REFERENCE TO RELATED APPLICATION

The present application claims priority from Japanese Patent Application No. JP 2009-104359 filed in the Japanese Patent Office on Apr. 22, 2009, the entire content of which is incorporated herein by reference.

BACKGROUND OF THE INVENTION

1. Field of the Invention

The present invention relates to a transmitting apparatus, a stereoscopic image data transmitting method, a receiving apparatus and a stereoscopic image data receiving method, and, particularly, to a transmitting apparatus that transmits stereoscopic image data containing left-eye image data and right-eye image data for displaying a stereoscopic image or the like.

2. Description of the Related Art

Recently, an interface such as a high-definition multimedia interface (HDMI) has been gaining popularity as a communication interface that transmits at high speed a digital video signal, namely a non-compressed (baseband) video signal (image data), and a digital audio signal (audio data) accompanying the video signal from a game machine, a digital versatile disc (DVD) recorder, a set-top box or another audio-visual (AV) source to a TV set, a projector or another display, for example. The details of HDMI standard are described in High-Definition Multimedia Interface Specification Version 1.3a, Nov. 10, 2006, for example.

SUMMARY OF THE INVENTION

For example, it can be assumed that stereoscopic image data containing left-eye image data and right-eye image data for displaying a stereoscopic image is transmitted from an AV source to a display, and a stereoscopic image is displayed using a binocular parallax in the display.

FIG. 30 shows a relationship between display positions of left and right images of an object on a screen and a reproduction position of a stereoscopic image when displaying a stereoscopic image using a binocular parallax. For example, regarding an object A in which a left image La and a right image Ra are displayed displaced to the right and to the left, respectively, on the screen as shown in FIG. 30, because left and right lines of sight cross each other at the front of the screen plane, the reproduction position of a stereoscopic image is located at the front of the screen plane.

Further, regarding an object B in which a left image Lb and a right image Rb are displayed at the same position on the screen as shown in FIG. 30, for example, because left and right lines of sight cross each other on the screen plane, the reproduction position of a stereoscopic image is located on the screen plane. Furthermore, regarding an object C in which a left image Lc and a right image Rc are displayed displaced to the left and to the right, respectively, on the screen as shown in FIG. 30, for example, because left and right lines of sight cross each other at the back of the screen plane, the reproduction position of a stereoscopic image is located at the back of the screen plane.

In FIG. 30, an object D is an object at infinity. Regarding the object D, display positions of a left image Ld and a right image Rd on the screen should be displaced from each other by an interpupillary distance (e.g. approximately 6.5 cm for adults). However, when a video signal for displaying a left-eye image and a right-eye image on the screen is the same, a distance of displacement between the left image Ld and the right image Rd varies by a screen size, and thereby the reproduction position of a stereoscopic image of the object D is not infinity in some cases.

For example, assume a video signal (left-eye video signal and right-eye video signal) V1 that is generated in such a way that a distance of displacement between the display positions of the left image Ld and the right image Rd on the screen equals the interpupillary distance in a small TV set or PC monitor with a 20-inch screen size. In the case of performing stereoscopic image display by displaying the left image Ld and the right image Rd based on the video signal V1 in the small TV set or PC monitor with a 20-inch screen size, for example, because the distance of displacement between the display positions of the left image Ld and the right image Rd on the screen is the interpupillary distance, the reproduction position of the stereoscopic image of the object D is infinity. However, in the case of performing stereoscopic image display by displaying the left image Ld and the right image Rd based on the video signal V1 in a projector with a 200-inch screen size, for example, the distance of displacement between the display positions of the left image Ld and the right image Rd on the screen is larger than the interpupillary distance, so that stereoscopic image display fails.

Further, assume, for example, a video signal (left-eye video signal and right-eye video signal) V2 that is generated in such a way that a distance of displacement between the display positions on a projector with a 200-inch screen size equals the interpupillary distance. In the case of performing stereoscopic image display by displaying the left image Ld and the right image Rd based on the video signal V2 in the projector with a 200-inch screen size, for example, because the distance of displacement between the display positions of the left image Ld and the right image Rd on the screen is the interpupillary distance, the reproduction position of the stereoscopic image of the object D is infinity. However, in the case of performing stereoscopic image display by displaying the left image Ld and the right image Rd based on the video signal V2 in a small TV set or PC monitor with a 20-inch screen size, for example, the distance of displacement between the display positions of the left image Ld and the right image Rd on the screen is smaller than the interpupillary distance, so that the reproduction position of the stereoscopic image of the object D is at the front of infinity.

The above-described effects when the screen size changes while the video signal for displaying the left-eye image and the right-eye image on the screen is the same extend not only to the infinite object D but also to the objects A and C. Specifically, because the distance of displacement between the display positions of the left image and the right image on the screen varies by the screen size, the reproduction positions of the stereoscopic images of the objects A and C on the basis of the screen plane shift significantly, or stereoscopic image display fails.

As described above, when the video signal for displaying the left-eye image and the right-eye image on the screen is the same, a change in screen size causes a failure in appropriate stereoscopic image display.

Heretofore, in the case of generating a left-eye video signal and a right-eye video signal dynamically at the time of image display, such as in a game machine, appropriate stereoscopic image display has been enabled even if a screen size changes by setting screen size information. In this case, however, it is necessary for a user to set the screen size information to the game machine according to a change in screen size.

Further, there is a technique heretofore used that detects displacement of a object in a left-eye image and a right-eye image by feature point extraction, inter-image correlation or the like from the left-eye image and the right-eye image, acquires a clue to depth information therefrom and then performs image display after correcting the depth information. However, the correction can be made more appropriately with use of screen size information. If the screen size information can be acquired automatically, it is not necessary for a user to set the screen size information.

In light of the foregoing, it is desirable to enable stereoscopic image display suited for a screen size without increasing user's workload.

According to an embodiment of the present invention, there is provided a transmitting apparatus including an image data output unit that outputs stereoscopic image data including left-eye image data and right-eye image data for displaying a stereoscopic image, a data transmitting unit that transmits the stereoscopic image data output from the image data output unit to an external device through a transmission path, and an information acquisition unit that acquires information related to a screen size from the external device through the transmission path. The image data output unit outputs the stereoscopic image data suited for the screen size obtained from the information acquired by the information acquisition unit.

According to another embodiment of the present invention, there is provided a receiving apparatus including a data receiving unit that receives stereoscopic image data including left-eye image data and right-eye image data for displaying a stereoscopic image from an external device through a transmission path, a data processing unit that processes the stereoscopic image data received by the data receiving unit and obtains the left-eye image data and the right-eye image data, and an information supply unit that supplies information related to a screen size to the external device through the transmission path. The data receiving unit receives stereoscopic image data suited for the screen size indicated by the information supplied by the information supply unit from the external device.

In the transmitting apparatus, the data transmitting unit transmits stereoscopic image data including left-eye image data and right-eye image data for displaying a stereoscopic image that is output from the image data output unit to an external device (receiving apparatus) through a transmission path. In the receiving apparatus, the data receiving unit receives stereoscopic image data including left-eye image data and right-eye image data for displaying a stereoscopic image from an external device (transmitting apparatus) through a transmission path, and the data processing unit processes the stereoscopic image data and obtains the left-eye image data and the right-eye image data.

In the transmitting apparatus, the information acquisition unit acquires information related to a screen size from the external device (receiving apparatus) through the transmission path, and the image data output unit outputs the stereoscopic image data suited for a screen size obtained from the information. In the receiving apparatus, the information supply unit supplies information related to a screen size to the external device (transmitting apparatus) through the transmission path, and the data receiving unit receives stereoscopic image data suited for a screen size. For example, the information acquisition unit acquires the information related to a screen size by reading the information from a storage unit, e.g. EDID ROM, included in the external device (receiving apparatus).

The screen size is a width, a height, a diagonal length or the like of an area where a left-eye image and a right-eye image are actually displayed. The information related to a screen size means information which directly represents a width, a height, a diagonal length or the like or information from which a width, a height, a diagonal length or the like can be obtained indirectly.

For example, the image data output unit dynamically generates the stereoscopic image data based on the screen size information and outputs the stereoscopic image data. Furthermore, the image data output unit estimates depth information based on existing stereoscopic image data, corrects the existing stereoscopic image data based on the estimated depth information and the screen size information and outputs the stereoscopic image data.

In this manner, in the transmitting apparatus, the information acquisition unit acquires the information related to a screen size from the external device (receiving apparatus), and the image data output unit outputs the stereoscopic image data suited for a screen size, and the data transmitting unit transmits the stereoscopic image data to the external device (receiving apparatus). In the receiving apparatus, the information supply unit supplies information related to a screen size to the external device (transmitting apparatus), and the data receiving unit receives stereoscopic image data suited for a screen size transmitted from the external device (transmitting apparatus). This enables stereoscopic image display suited for a screen size without increasing user's workload.

For example, the image data output unit of the transmitting apparatus outputs the stereoscopic image data suited for the screen size by using the screen size and visual distance information. The visual distance is a distance from a viewer to a screen. Furthermore, the image data output unit may use recommended visual distance information obtained based on the screen size as the visual distance information. For example, the recommended visual distance is two to three times a screen height. In this case, it is possible to generate or correct stereoscopic image data without user's setting, thereby reducing user's workload.

Additionally, the transmitting apparatus may further include an adjustment unit for a user to adjust the screen size and the visual distance by using the screen size and the recommended visual distance as default values. In this case, a user can start adjustment of a visual distance from a nearly optimum value, and it is thereby possible to efficiently adjust the visual distance.

For example, when the screen size is sufficiently large, the information supply unit of the receiving apparatus supplies information indicating that the screen size is sufficiently large as the information related to the screen size. When the screen size is sufficiently large, the ratio of an interpupillary distance with respect to the screen size is small. Further, when the screen size is sufficiently large, it can be assumed that the visual distance is sufficiently long. At the time when the image data output unit of the transmitting apparatus outputs stereoscopic image data, an accurate value of the screen size is not necessary, and it is enough to know that the screen size is sufficiently large. When the information acquired by the information acquisition unit indicates that the screen size is sufficiently large, the image data output unit of the transmitting apparatus outputs the stereoscopic image data suited for a case where the screen size is sufficiently large.

For example, the data transmitting unit of the transmitting apparatus transmits the stereoscopic image data to the external device through the transmission path by differential signals over a plurality of channels. The data receiving unit of the receiving apparatus receives the stereoscopic image data from the external device through the transmission path by differential signals over a plurality of channels.

For example, the information acquisition unit of the transmitting apparatus acquires the information related to a screen size from the external device (receiving apparatus) through a control data line making up the transmission path (e.g. a CEC line of an HDMI cable etc.). Furthermore, for example, the information acquisition unit acquires information related to the screen size through a two-way communication path made up of a predetermined line of the transmission path. For example, the two-way communication path is a pair of differential transmission paths, and at least one of the pair of differential transmission paths has a function of notifying a connection state of the external device with a direct-current bias potential (e.g. an HPD line of an HDMI cable etc.).

According to the embodiments of the present invention described above, information related to a screen size is supplied from the receiving apparatus to the transmitting apparatus, and stereoscopic image data suited for a screen size is transmitted from the transmitting apparatus to the receiving apparatus. It is thereby possible to display a stereoscopic image suited for a screen size without increasing user's workload.

BRIEF DESCRIPTION OF THE DRAWINGS

FIG. 2A is a view showing a "field sequence scheme", which is an example of a display scheme of a stereoscopic image.

FIG. 2B is a view showing a "phase difference plate scheme", which is an example of a display scheme of a stereoscopic image.

FIG. 3 is a block diagram showing an exemplary configuration of a game machine (source device) included in the AV system.

FIG. 4 is a block diagram showing an exemplary configuration of a TV set (sink device) included in the AV system.

FIG. 5 is a block diagram showing exemplary configurations of an HDMI transmitting unit (HDMI source) and an HDMI receiving unit (HDMI sink).

FIG. 8 is a view showing a pin-out (type-A) of HDMI terminals of a source device and a sink device to which an HDMI cable is connected.

FIG. 9 is a view showing left-eye (L) image data and right-eye (R) image data (image data in a pixel format of 1920×1080p).

FIG. 16 is a view showing an example of video data in a Short Video Descriptor region.

FIG. 17 is a view showing an example of a data structure in a Vender Specific region.

FIG. 25 is a view showing estimated depth information of an image.

FIG. 30 is a view to describe a reproduction position or the like of a stereoscopic image in stereoscopic image display using a binocular parallax.

DETAILED DESCRIPTION OF THE EMBODIMENT(S)

Figure 1:
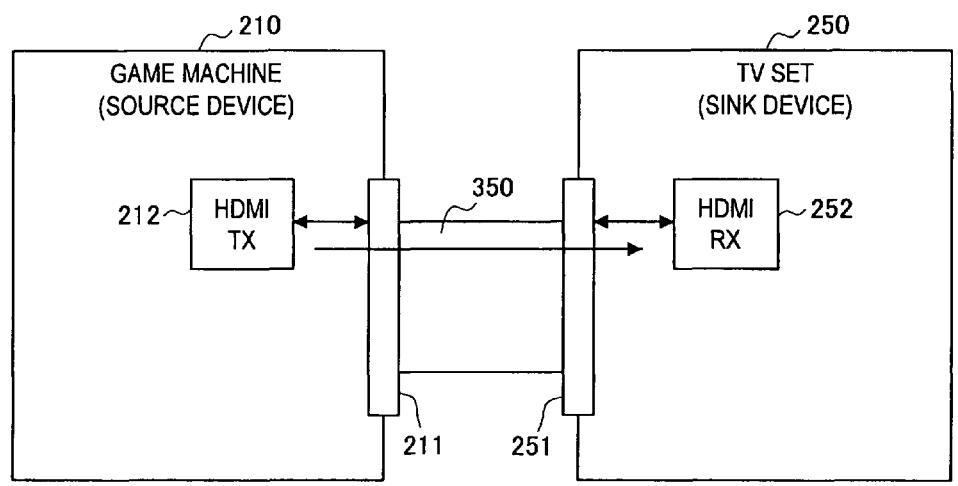
FIG. 1 is a block diagram showing an exemplary configuration of an AV system according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Note that the description will be done in the order below.
1. Embodiment
2. Alternative Example

1. Embodiment

[Exemplary Configuration of AV System]

FIG. 1 shows an exemplary configuration of an audio visual (AV) system 200 according to an embodiment of the present invention. The AV system 200 includes a game machine 210 serving as a source device and a TV set 250 serving as a sink device. The source device may be other than a game machine, such as a device of generating a 3D video or a device of playing back a 3D video like a Blu-ray Disc player.

The game machine 210 and the TV set 250 are connected through an HDMI cable 350. The game machine 210 has an HDMI terminal 211 to which an HDMI transmitting unit (HDMI TX) 212 is connected. The TV set 250 has an HDMI terminal 251 to which an HDMI receiving unit (HDMI RX) 252 is connected. One end of the HDMI cable 350 is connected to the HDMI terminal 211 of the game machine 210, and the other end of the HDMI cable 350 is connected to the HDMI terminal 251 of the TV set 250.

In the AV system 200 shown in FIG. 1, non-compressed image data (video signal) from the game machine 210 is transmitted to the TV set 250 through the HDMI cable 350, and an image based on the image data from the game machine 210 is displayed in the TV set 250. Further, non-compressed audio data (audio signal) from the game machine 210 is transmitted to the TV set 250 through the HDMI cable 350, and a sound based on the audio data from the game machine 210 is output in the TV set 250.

In the case where the image data that is transmitted from the game machine 210 to the TV set 250 is stereoscopic image data (3D image data) for displaying a stereoscopic image, the TV set 250 performs display of a stereoscopic image.

Examples of a stereoscopic image display scheme are described hereinbelow. As the stereoscopic image display scheme, there is a scheme that displays a left-eye (L) image and a right-eye (R) image alternately in a field-by-field manner, which is a so-called "field sequence scheme", as shown in FIG. 2(a), for example. In this display scheme, it is necessary to drive at twice a normal frame rate in the TV set. Further, in this display scheme, while it is not necessary to make an optical film adhere to a display unit, it is necessary to switch the open and close state of shutters of left and right lends units in synchronization with a field of the display unit in glasses worn by a user.

Further, as the stereoscopic image display scheme, there is a scheme that displays a left-eye (L) image and a right-eye (R) image by switching them in a line-by-line manner, which is a so-called "phase difference plate scheme", as shown in FIG. 2(b), for example. In this display scheme, a polarizing plate that makes the orientation of polarization differ from line to line by 90 degrees is adhered to a display unit in the TV set. Then, light of an opposite-eye image is blocked by polarized glasses worn by a user, thereby achieving display of a stereoscopic image.

[Exemplary Configuration of Game Machine]

FIG. 3 shows an exemplary configuration of the game machine 210.

The game machine 210 includes the HDMI terminal 211, the HDMI transmitting unit 212, an Ethernet interface (I/F) 214 and a network terminal 215. The game machine 210 further includes an input interface 216, a control pad 217, a drive interface 218 and a digital versatile disk/Blu-ray Disc (DVD/BD) drive 219.

The game machine 210 further includes an internal bus 220, a central processing unit (CPU) 221, flash read only memory (ROM) 222, and dynamic random access memory (DRAM) 223. The game machine 210 further includes a rendering processing unit 224, video random access memory (VRAM) 225, an audio processing unit 226 and an MPEG decoder 227. It should be noted that "Ethernet" and "Blu-ray Disc" are registered trademarks.

The HDMI transmitting unit (HDMI source) 212 transmits non-compressed (baseband) video (image) and audio data from the HDMI terminal 211 by communication in conformity to the HDMI standard. The details of the HDMI transmitting unit 212 are described later.

The CPU 221, the flash ROM 222, the DRAM 223, the Ethernet interface 214, the input interface 216 and the drive interface 218 are connected to the internal bus 220. The rendering processing unit 224, the VRAM 225, the audio processing unit 226 and the MPEG decoder 227 are also connected to the internal bus 220. The DVD/BD drive 219 is connected to the internal bus 220 via the drive interface 218. The DVD/BD drive 219 performs reproduction of contents such as a movie recorded on a recording medium such as a DVD, reproduction of game software information recorded on such a recording medium or the like.

In the case where the game machine 210 functions as a player, the MPEG decoder 227 performs decoding of compressed video data and audio data that are reproduced from a recording medium such as a DVD and thereby obtains non-compressed video data and audio data.

The CPU 221 controls the operation of each unit of the game machine 210. The flash ROM 222 stores control software and data. The DRAM 223 forms a work area of the CPU 221. The CPU 221 expands the software and data read from the flash ROM 222 in the DRAM 223 and starts the software, thereby controlling each unit of the game machine 210.

The control pad 217 constitutes a user operation unit. The input interface 216 captures an operation input signal from the control pad 217 into the internal bus 220. The rendering processing unit 224 includes a rendering engine. In the case where the game machine 210 functions as a game machine, the rendering processing unit 224 generates a game image dynamically in response to a user's operation from the control pad 217 based on the game software information and expands it in the VRAM 225.

The rendering processing unit 224 generates image data for displaying a two-dimensional image and also generates stereoscopic image data (left-eye image data and right-eye image data) for displaying a stereoscopic image as game image data. In this case, the rendering processing unit 224 generates the stereoscopic image data by using information of the screen size of the TV set 250 and a visual distance as described later.

If image data of contents such as a movie reproduced from a recording medium such as a DVD is stereoscopic image data for displaying a stereoscopic image, the rendering processing unit 224 performs correction of the stereoscopic image data according to an instruction from a user. The correction of the stereoscopic image data is performed by using information of the screen size of the TV set 250 and a visual distance, just like the generation of the stereoscopic image data described above. Then, when transmitting the stereoscopic image data for displaying a stereoscopic image over TMDS channels of HDMI, the stereoscopic image data is processed into the state conforming to a transmission scheme. The stereoscopic image data is composed of left-eye image data and right-eye image data. A transmission scheme of stereoscopic image data or the like is described later.

In the case where the game machine 210 functions as a game machine, the audio processing unit 226 generates audio data for obtaining a game sound corresponding to a game image in response to a user's operation from the control pad 217 based on the game software information.

The operation of the game machine 210 shown in FIG. 3 is briefly described hereinbelow.

The operation when the game machine 210 reproduces contents such as a movie recorded on a recording medium such as a DVD is described by way of illustration.

The image data and audio data that are reproduced by the DVD/BD drive 219 are decoded by the MPEG decoder 227 and thereby non-compressed image and audio data are obtained. The image and audio data are supplied to the HDMI transmitting unit 212 and sent out from the HDMI terminal 211 to the HDMI cable over TMDS channels of HDMI.

Further, the operation in the case where the game machine 210 functions as a game machine is described hereinafter.

Image data for displaying a game image is generated in the rendering processing unit 224 dynamically in response to a user's operation from the control pad 217 based on game software information and expanded in the VRAM 225. If image data to be generated is stereoscopic image data (left-eye image data and right-eye image data), the stereoscopic image data is generated in the rendering processing unit 224 appropriately by using information of the screen size of the TV set 250 and a visual distance. The image data is then read from the VRAM 225 and supplied to the HDMI transmitting unit 212.

Further, in this case, audio data for obtaining a game sound corresponding to the game image is generated in the audio processing unit 226 in response to a user's operation from the control pad 217 based on the game software information. The audio data is supplied to the HDMI transmitting unit 212. The game image and the audio data that are supplied to the HDMI transmitting unit 212 are then sent out from the HDMI terminal 211 to the HDMI cable over TMDS channels of HDMI.

Further, the operation in the case where the game machine 210 reproduces contents such as a movie, image data obtained as a result of decoding by the MPEG decoder 227 is stereoscopic image data, and a user gives an instruction to perform correction is as follows.

In such a case, stereoscopic image data (left-eye image data and right-eye image data) obtained in the MPEG decoder 227 is supplied to the rendering processing unit 224 through the internal bus 220. In the rendering processing unit 224, the stereoscopic image data (existing stereoscopic image data) is corrected by using information of the screen size of the TV set 250 and a visual distance. The stereoscopic image data corrected in this manner is expanded in the VRAM 225 and read out and then supplied to the HDMI transmitting unit 212.

A flow of the stereoscopic image data generation and correction process described above in the rendering processing unit 224 is described later.

The image data and the audio data that are supplied from the rendering processing unit 224 and the audio processing unit 226 to the HDMI transmitting unit 212 are packaged in the HDMI transmitting unit 212 and output to the HDMI terminal 211. If the image data is stereoscopic image data (left-eye image data and right-eye image data), the stereoscopic image data is processed into the state conforming to a transmission scheme in the rendering processing unit 224 and then supplied to the HDMI transmitting unit 212.

[Exemplary Configuration of TV Set]

FIG. 4 shows an exemplary configuration of the TV set 250. The TV set 250 includes the HDMI terminal 251, the HDMI receiving unit 252 and a 3D signal processing unit 254. The TV set 250 further includes an antenna terminal 255, a digital tuner 256, a demultiplexer 257, an MPEG decoder 258, a video signal processing circuit 259, a graphics generation circuit 260, a panel drive circuit 261 and a display panel 262.

The TV set 250 further includes an audio signal processing circuit 263, an audio amplification circuit 264, a speaker 265, an internal bus 270, a CPU 271, flash ROM 272, and DRAM 273. The TV set 250 further includes an Ethernet interface 274, a network terminal 275, a remote control receiving unit 276, a remote control transmitter 277 and a DTCP circuit 278.

The antenna terminal 255 is a terminal for inputting a television broadcast signal that is received by a receiving antenna (not shown). The digital tuner 256 processes the television broadcast signal input to the antenna terminal 255 and outputs a predetermined transport stream corresponding to a user-selected channel. The demultiplexer 257 extracts a partial transport stream (TS) (video data TS packet and audio data TS packet) corresponding to the user-selected channel from the transport stream obtained by the digital tuner 256.

Further, the demultiplexer 257 acquires program specific information/service information (PSI/SI) from the transport stream obtained by the digital tuner 256 and outputs it to the CPU 271. In the transport stream obtained by the digital tuner 256, a plurality of channels are multiplexed. The demultiplexer 257 can extract the partial TS of a given channel from the transport stream by obtaining information of a packet ID (PID) of the given channel from PSI/SI (PAT/PMT).

The MPEG decoder 258 performs decoding of a video packetized elementary stream (PES) packet that is composed of the video data TS packet obtained in the demultiplexer 257 and thereby obtains image data. Further, the MPEG decoder 258 performs decoding of an audio PES packet that is composed of the audio data TS packet obtained in the demultiplexer 257 and thereby obtains audio data.

The video signal processing circuit 259 and the graphics generation circuit 260 perform scaling (resolution conversion), superimposition of graphics data and so on as appropriate on the image data obtained by the MPEG decoder 258 or the image data received by the HDMI receiving unit 252. Further, if the image data received by the HDMI receiving unit 252 is stereoscopic image data, the video signal processing circuit 259 performs processing for displaying a stereoscopic image on left-eye image data and right-eye image data (cf. FIG. 2). The panel drive circuit 261 drives the display panel 262 based on video (image) data output from the graphics generation circuit 260.

The display panel 262 is a liquid crystal display (LCD), a plasma display panel (PDP) or the like, for example. The audio signal processing circuit 263 performs necessary processing such as D/A conversion on audio data obtained by the MPEG decoder 258. The audio amplification circuit 264 amplifies an audio signal output from the audio signal processing circuit 263 and supplies it to the speaker 265.

The CPU 271 controls the operation of each unit of the TV set 250. The flash ROM 272 stores control software and data. The DRAM 273 forms a work area of the CPU 271. The CPU 271 expands the software and data read from the flash ROM 272 in the DRAM 273 and starts the software, thereby controlling each unit of the TV set 250. The DTCP circuit 278 decrypts encrypted data supplied from the network terminal 275 to the Ethernet interface 274.

The remote control receiving unit 276 receives a remote control signal (remote control code) transmitted from the remote control transmitter 277 and supplies it to the CPU 271. The CPU 271 controls each unit of the TV set 250 based on the remote control code. The network terminal 275 is a terminal for making connection with a network and is connected to the Ethernet interface 274. The CPU 271, the flash ROM 272, the DRAM 273 and the Ethernet interface 274 are connected to the internal bus 270.

The HDMI receiving unit (HDMI sink) 252 receives non-compressed image (video) and audio data that are supplied to the HDMI terminal 251 through the HDMI cable 350 by communication in conformity to the HDMI standard. The details of the HDMI receiving unit 252 are described later.

The 3D signal processing unit 254 performs processing (decoding) conforming to a transmission scheme on the stereoscopic image data received by the HDMI receiving unit 252 and thereby generates left-eye image data and right-eye image data. The 3D signal processing unit 254 thus performs inverse processing of the rendering processing unit 224 of the game machine 210 described above and acquires left-eye image data and right-eye image data making up the stereoscopic image data.

The operation of the TV set 250 shown in FIG. 4 is briefly described hereinbelow.

A television broadcast signal that is input to the antenna terminal 255 is supplied to the digital tuner 256. In the digital tuner 256, the television broadcast signal is processed and a predetermined transport stream corresponding to a user-selected channel is output, and the predetermined transport stream is supplied to the demultiplexer 257. In the demultiplexer 257, a partial TS (video data TS packet and audio data TS packet) corresponding to the user-selected channel is extracted from the transport stream, and the partial TS is supplied to the MPEG decoder 258.

In the MPEG decoder 258, decoding is performed on a video PES packet that is composed of the video data TS packet, and video data is thereby obtained. Then, scaling (resolution conversion), superimposition of graphics data and so on are performed on the video data as appropriate in the video signal processing circuit 259 and the graphics generation circuit 260, and the image data is supplied to the panel drive circuit 261. Consequently, an image corresponding to the user-selected channel is displayed on the display panel 262.

Further, in the MPEG decoder 258, decoding is performed on an audio PES packet that is composed of the audio data TS packet, and audio data is thereby obtained. Then, necessary processing such as D/A conversion is performed on the audio data in the audio signal processing circuit 263, and the audio data is amplified by the audio amplification circuit 264 and then supplied to the speaker 265. Consequently, a sound corresponding to the user-selected channel is output from the speaker 265.

On the other hand, encrypted contents data (image data and audio data) that is supplied from the network terminal 275 to the Ethernet interface 274 is decrypted by the DTCP circuit 278 and then supplied to the MPEG decoder 258. The subsequent operation is the same as the above-described operation when receiving the television broadcast signal and, consequently, the image is displayed on the display panel 262 and the sound is output from the speaker 265.

In the HDMI receiving unit 252, image data and audio data transmitted from the game machine 210 that is connected to the HDMI terminal 251 through the HDMI cable 350 are acquired. The image data is supplied to the video signal processing circuit 259 via the 3D signal processing unit 254. The audio data is supplied directly to the audio signal processing circuit 263. The subsequent operation is the same as the above-described operation when receiving the television broadcast signal and, consequently, the image is displayed on the display panel 262 and the sound is output from the speaker 265.

If the image data received by the HDMI receiving unit 252 is stereoscopic image data (3D image data), processing (decoding) conforming to a transmission scheme is performed on the stereoscopic image data in the 3D signal processing unit 254, so that left-eye image data and right-eye image data are generated. The left-eye image data and the right-eye image data are then supplied from the 3D signal processing unit 254 to the video signal processing circuit 259. When the left-eye image data and the right-eye image data making up the stereoscopic image data are supplied, image data for displaying a stereoscopic image (cf. FIG. 2) is generated in the video signal processing circuit 259, based on the left-eye image data and the right-eye image data. Consequently, a stereoscopic image is displayed on the display panel 262.

[Exemplary Configurations of HDMI Transmitting Unit and HDMI Receiving Unit]

FIG. 5 shows exemplary configurations of the HDMI transmitting unit (HDMI source) 212 of the game machine 210 and the HDMI receiving unit (HDMI sink) 252 of the TV set 250 in the AV system 200 shown in FIG. 1.

The HDMI transmitting unit 212 transmits differential signals corresponding to image data of a non-compressed image for one screen in one direction to the HDMI receiving unit 252 through a plurality of channels in an effective image period (which is also referred to hereinafter as an active video period). The effective image period is a period from one vertical synchronizing signal to the next vertical synchronizing signal, excluding a horizontal blanking period and a vertical blanking period. Further, the HDMI transmitting unit 212 transmits differential signals corresponding to at least audio data accompanying the image, control data, other auxiliary data and so on in one direction to the HDMI receiving unit 252 through a plurality of channels in the horizontal blanking period or the vertical blanking period.

Transmission channels of the HDMI system including the HDMI transmitting unit 212 and the HDMI receiving unit 252 are as follows. Specifically, there are three TMDS channels #0 to #2 that serve as transmission channels for transmitting pixel data and audio data serially in one direction from the HDMI transmitting unit 212 to the HDMI receiving unit 252 in synchronization with a pixel clock. There is also a TMDS clock channel that serves as a transmission channel for transmitting a pixel clock.

The HDMI transmitting unit 212 includes an HDMI transmitter 81. The transmitter 81, for example, converts pixel data of a non-compressed image into corresponding differential signals and then transmits the signals serially in one direction to the HDMI receiving unit 252 connected through the HDMI cable 350 over the three TMDS channels #0, #1 and #2, which are the plurality of channels.

Further, the transmitter 81 converts audio data accompanying the non-compressed image and further necessary control data, other auxiliary data and so on into corresponding differential signals and then transmits the signals serially in one direction to the HDMI receiving unit 252 over the three TMDS channels #0, #1 and #2.

The transmitter 81 further transmits a pixel clock that is synchronized with the pixel data transmitted over the three TMDS channels #0, #1 and #2 to the HDMI receiving unit 252 connected through the HDMI cable 350 over a TMDS clock channel. In one TMDS channel #i (i=0, 1, 2), ten-bit pixel data is transmitted in one pixel clock.

The HDMI receiving unit 252 receives the differential signals corresponding to image data that are transmitted in one direction from the HDMI transmitting unit 212 through a plurality of channels in the active video period. The HDMI receiving unit 252 further receives the differential signals corresponding to audio data and control data that are transmitted in one direction from the HDMI transmitting unit 212 through a plurality of channels in the horizontal blanking period or the vertical blanking period.

Specifically, the HDMI receiving unit 252 includes an HDMI receiver 82. The HDMI receiver 82 receives the differential signals corresponding to image data and the differential signals corresponding to audio data and control data that are transmitted in one direction from the HDMI transmitting unit 212 over the TMDS channels #0, #1 and #2. At this time, the HDMI receiving unit 252 receives the signals in synchronization with the pixel clock that is transmitted from the HDMI transmitting unit 212 through the TMDS clock channel.

In addition to the TMDS channels #0 to #2 and the TMDS clock channel described above, the transmission channels of the HDMI system including the HDMI transmitting unit 212 and the HDMI receiving unit 252 involves transmission channels called a display data channel (DDC) 83 and a CEC line 84. The DDC 83 is made up of two signal lines (not shown) that are included in the HDMI cable 350 and used when the HDMI transmitting unit 212 reads enhanced extended display identification data (E-EDID) from the HDMI receiving unit 252 that is connected through the HDMI cable 350.

Specifically, the HDMI receiving unit 252 includes EDID read only memory (ROM) 85 that stores E-EDID which is capability information related to its own configuration/capability in addition to the HDMI receiver 82. The HDMI transmitting unit 212 reads E-EDID of the HDMI receiving unit 252 from the HDMI receiving unit 252 that is connected through the HDMI cable 350 over the DDC 83 in response to a request from the CPU 221 (cf. FIG. 3), for example. The HDMI transmitting unit 212 transmits the read E-EDID to the CPU 221. The CPU 221 stores the E-EDID into the flash ROM 222 or the DRAM 223.

The CPU 221 can recognize the capability configuration of the HDMI receiving unit 252 based on the E-EDID. For example, the CPU 221 recognizes a format (resolution, frame rate, aspect etc.) of image data with which the TV set 250 including the HDMI receiving unit 252 is compatible. Further, in this embodiment, the CPU 221 recognizes a size of an actual image display area (screen size) of the TV set 250 including the HDMI receiving unit 252 based on information related to a screen size, which is described later, contained in the E-EDID.

The CEC line 84 is made up of one signal line (not shown) that is included in the HDMI cable 350 and used for performing two-way communication of control data between the HDMI transmitting unit 212 and the HDMI receiving unit 252. The CEC line 84 constitutes a control data line.

Further, a line (HPD line) 86 that is connected to a pin called a hot plug detect (HPD) is included in the HDMI cable 350. The source device can detect connection of the sink device by using the line 86. Furthermore, a line 87 that is used to supply a power from the source device to the sink device is included in the HDMI cable 350. In addition, a reserve line 88 is included in the HDMI cable 350.

Figure 6:
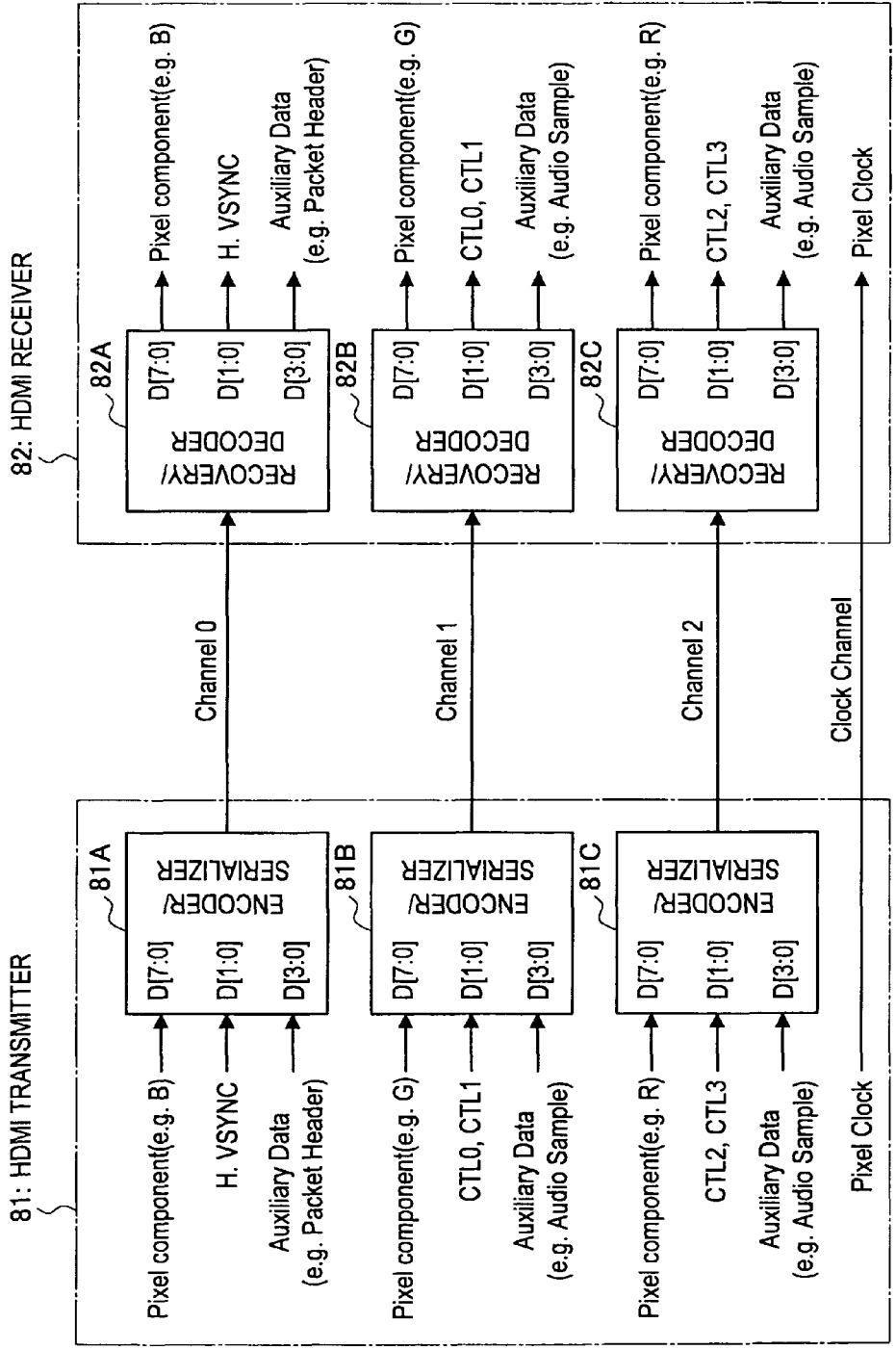
FIG. 6 is a block diagram showing exemplary configurations of an HDMI transmitter in the HDMI transmitting unit and an HDMI receiver in the HDMI receiving unit.

FIG. 6 shows exemplary configurations of the HDMI transmitter 81 and the HDMI receiver 82 in FIG. 5.

The HDMI transmitter 81 includes three encoder/serializers 81A, 81B and 81C respectively corresponding to the three TMDS channels #0, #1 and #2. Each of the encoder/serializers 81A, 81B and 81C encodes image data, auxiliary data and control data supplied thereto, converts the data from parallel data to serial data and then transmits the data by differential signals. If the image data contains three components R, G and B, for example, the component B is supplied to the encoder/serializer 81A, the component G is supplied to the encoder/serializer 81B, and the component R is supplied to the encoder/serializer 81C.

The auxiliary data involves audio data and a control packet, for example, and the control packet is supplied to the encoder/serializer 81A, and the audio data is supplied to the encoder/serializers 81B and 81C, for example. The control data involves a one-bit vertical synchronizing signal (VSYNC), a one-bit horizontal synchronizing signal (HSYNC) and one-bit control bits CTL0, CTL1, CTL2 and CTL3. The vertical synchronizing signal and the horizontal synchronizing signal are supplied to the encoder/serializer 81A. The control bits CTL0 and CTL1 are supplied to the encoder/serializer 81B, and the control bits CTL2 and CTL3 are supplied to the encoder/serializer 81C.

The encoder/serializer 81A transmits the component B of image data, the vertical synchronizing signal, the horizontal synchronizing signal and the auxiliary data that are supplied thereto in a time division manner. Specifically, the encoder/serializer 81A processes the component B of image data supplied thereto into parallel data in eight bits each, which is a fixed number of bits. The encoder/serializer 81A then encodes the parallel data, converts the encoded parallel data into serial data and transmits the serial data over the TMDS channel #0.

Further, the encoder/serializer 81A encodes two-bit parallel data of the vertical synchronizing signal and the horizontal synchronizing signal supplied thereto, converts the encoded parallel data into serial data and transmits the serial data over the TMDS channel #0. The encoder/serializer 81A further processes the auxiliary data supplied thereto into parallel data in four bits each. The encoder/serializer 81A then encodes the parallel data, converts the encoded parallel data into serial data and transmits the serial data over the TMDS channel #0.

The encoder/serializer 81B transmits the component G of image data, the control bits CTL0 and CTL1 and the auxiliary data that are supplied thereto in a time division manner. Specifically, the encoder/serializer 81B processes the component G of image data supplied thereto into parallel data in eight bits each, which is a fixed number of bits. The encoder/serializer 81B then encodes the parallel data, converts the encoded parallel data into serial data and transmits the serial data over the TMDS channel #1.

Further, the encoder/serializer 81B encodes two-bit parallel data of the control bits CTL0 and CTL1 supplied thereto, converts the encoded parallel data into serial data and transmits the serial data over the TMDS channel #1. The encoder/serializer 81B further processes the auxiliary data supplied thereto into parallel data in four bits each. The encoder/serializer 81B then encodes the parallel data, converts the encoded parallel data into serial data and transmits the serial data over the TMDS channel #1.

The encoder/serializer 81C transmits the component R of image data, the control bits CTL2 and CTL3 and the auxiliary data that are supplied thereto in a time division manner. Specifically, the encoder/serializer 81C processes the component R of image data supplied thereto into parallel data in eight bits each, which is a fixed number of bits. The encoder/serializer 81C then encodes the parallel data, converts the encoded parallel data into serial data and transmits the serial data over the TMDS channel #2.

Further, the encoder/serializer 81C encodes two-bit parallel data of the control bits CTL2 and CTL3 supplied thereto, converts the encoded parallel data into serial data and transmits the serial data over the TMDS channel #2. The encoder/serializer 81C further processes the auxiliary data supplied thereto into parallel data in four bits each. The encoder/serializer 81C then encodes the parallel data, converts the encoded parallel data into serial data and transmits the serial data over the TMDS channel #2.

The HDMI receiver 82 includes three recovery/decoders 82A, 82B and 82C respectively corresponding to the three TMDS channels #0, #1 and #2. Each of the recovery/decoders 82A, 82B and 82C receives the image data, the auxiliary data and the control data that are transmitted by the differential signals over the TMDS channels #0, #1 and #2, respectively. Each of the recovery/decoders 82A, 82B and 82C then converts the image data, the auxiliary data and the control data from serial data to parallel data and decodes and outputs them.

Specifically, the recovery/decoder 82A receives the component B of image data, the vertical synchronizing signal, the horizontal synchronizing signal and the auxiliary data that are transmitted by the differential signals over the TMDS channel #0. The recovery/decoder 82A then converts the component B of image data, the vertical synchronizing signal, the horizontal synchronizing signal and the auxiliary data from serial data to parallel data and decodes and outputs them.

The recovery/decoder 82B receives the component G of image data, the control bits CTL0 and CTL1 and the auxiliary data that are transmitted by the differential signals over the TMDS channel #1. The recovery/decoder 82B then converts the component G of image data, the control bits CTL0 and CTL1 and the auxiliary data from serial data to parallel data and decodes and outputs them.

The recovery/decoder 82C receives the component R of image data, the control bits CTL2 and CTL3 and the auxiliary data that are transmitted by the differential signals over the TMDS channel #2. The recovery/decoder 82C then converts the component R of image data, the control bits CTL2 and CTL3 and the auxiliary data from serial data to parallel data and decodes and outputs them.

Figure 7:
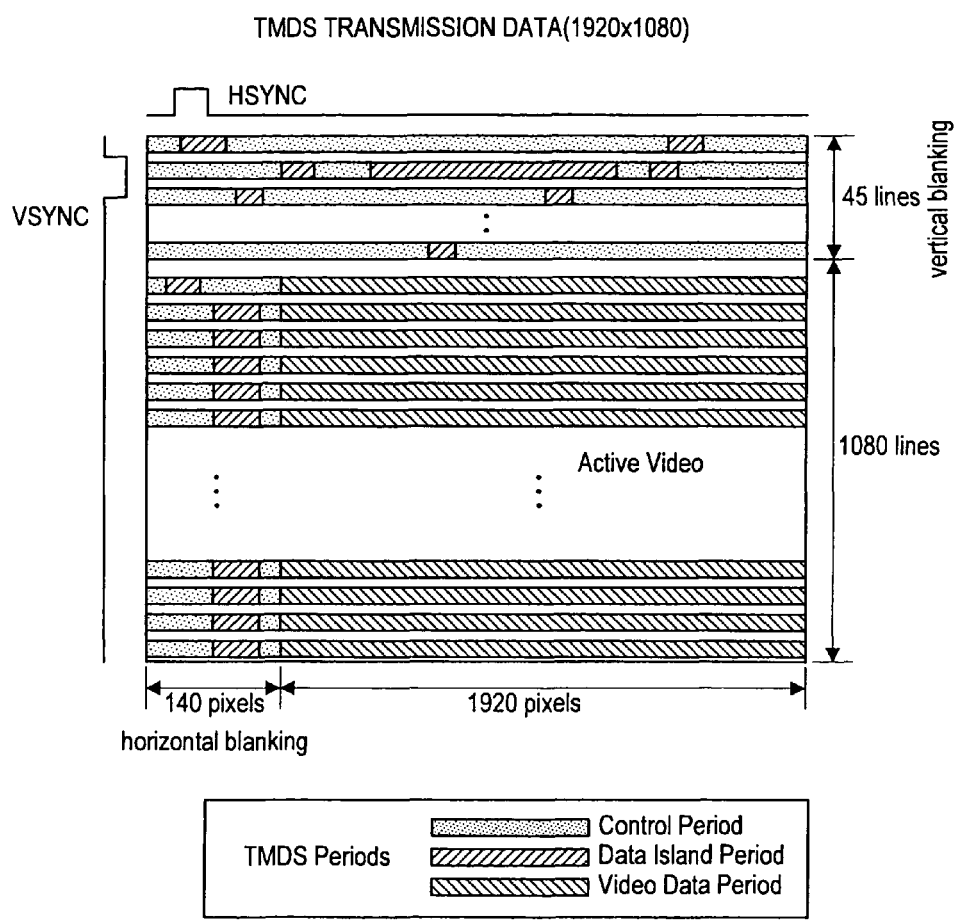
FIG. 7 is a view showing an exemplary structure of TMDS transmission data (when image data of 1920 pixels in width by 1080 lines in height is transmitted).

FIG. 7 shows an exemplary structure of TMDS transmission data. FIG. 7 shows periods of various kinds of transmission data in the case where image data of 1920 pixels in width by 1080 lines in height is transmitted over the TMDS channels #0, #1 and #2.

In a video field in which transmission data is transmitted over the three TMDS channels #0, #1 and #2 of HDMI, three types of periods exist depending on the type of transmission data. The three types of periods are a video data period, a data island period and a control period.

The video field period is a period between the active edge of a certain vertical synchronizing signal and the active edge of the next vertical synchronizing signal. The video field period is divided into a horizontal blanking, a vertical blanking and an active video period. The active video period is a period of the video field excluding the horizontal blanking and the vertical blanking.

The video data period is allocated to the active video period. In the video data period, data of active pixels in 1920 pixels by 1080 lines that make up non-compressed image data for one screen is transmitted.

The data island period and the control period are allocated to the horizontal blanking and the vertical blanking. In the data island period and the control period, auxiliary data is transmitted. Specifically, the data island period is allocated to parts of the horizontal blanking and the vertical blanking. In the data island period, auxiliary data which is not related to control, such as an audio data packet, for example, is transmitted.

The control period is allocated to the other parts of the horizontal blanking and the vertical blanking. In the control period, auxiliary data which is related to control, such as a vertical synchronizing signal, a horizontal synchronizing signal and a control packet, for example, is transmitted.

FIG. 8 shows an example of a pin-out (type-A) of the HDMI terminal 211 and the HDMI terminal 251. The pin-out shown in FIG. 8 is called a type-A pin-out.

Two differential lines through which TMDS data #i+ and TMDS data #i−, which are differential signals of the TMDS channel #i, are connected to pins (with pin numbers 1, 4 and 7) to which TMDS data #i+ is allocated and pins (with pin numbers 3, 6 and 9) to which TMDS data #i− is allocated.

The CEC line 84 through which a CEC signal that is control data is transmitted is connected to a pin with a pin number 13, and a pin with a pin number 14 is a reserved pin. A line through which a serial data (SDA) signal such as E-EDID is transmitted is connected to a pin with a pin number 16, and a line through which a serial clock (SCL) signal that is a clock signal used for synchronization at the time of transmitting and receiving the SDA signal is transmitted is connected to a pin with a pin number 15. The above-described DDC 83 is made up of the line through which the SDA signal is transmitted and the line through which the SCL signal is transmitted.

Further, the above-described HPD line 86 for a source device to detect connection of a sink device is connected to a pin with a pin number 19. The above-described line 87 for power supply is connected to a pin with a pin number 18.

[Exemplary Transmission Scheme of Stereoscopic Image Data]

First to third transmission schemes for transmitting stereoscopic image data (3D image data) are described hereinbelow, although other transmission schemes are also applicable. Hereinafter, a case where left-eye (L) image data and right-eye (R) image data are image data in a pixel format of 1920× 1080p as shown in FIG. 9 is described by way of illustration.

Figure 10A:
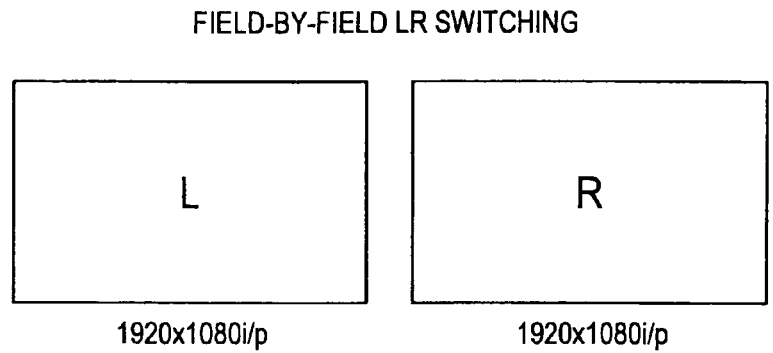
FIG. 10A is a view to describe a scheme that transmits left-eye image data and right-eye image data by sequentially switching them in a field-by-field manner, which is a 3D (stereoscopic) image data transmission scheme.
Figure 11:
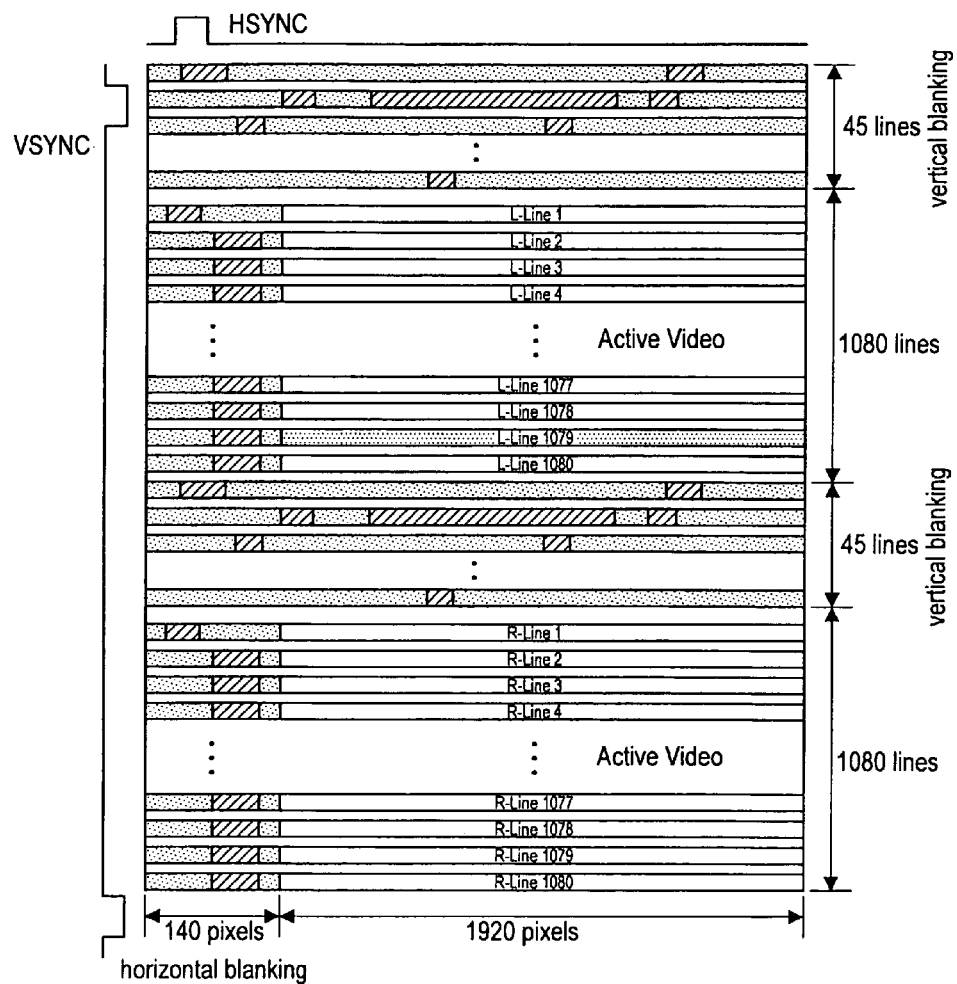
FIG. 11 is a view showing an example of TMDS transmission data in the scheme that transmits left-eye image data and right-eye image data by sequentially switching them in a field-by-field manner.

The first transmission scheme is a scheme that transmits left-eye image data and right-eye image data by sequentially switching them in a field-by-field manner as shown in FIG. 10(a). In this scheme, although field memory for switching is necessary, signal processing in a source device is the simplest. FIG. 11 shows exemplary TMDS transmission data in the first transmission scheme. In this scheme, left-eye (L) image data of active pixels in 1920 pixels by 1080 lines are placed in the active video period in 1920 pixels by 1080 lines in an odd number field. Further, right-eye (R) image data of active pixels in 1920 pixels by 1080 lines are placed in the active video period in 1920 pixels by 1080 lines in an even number field.

Figure 10B:
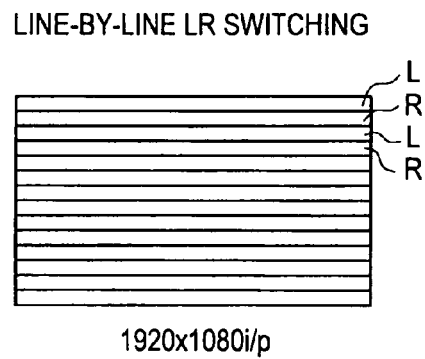
FIG. 10B is a view to describe a scheme that transmits one line of left-eye image data and one line of right-eye image data alternately with one another, which is a 3D (stereoscopic) image data transmission scheme.

The second transmission scheme is a scheme that transmits one line of left-eye image data and one line of right-eye image data alternately with one another as shown in FIG. 10(b). In this scheme, lines are reduced to ½ respectively in the left-eye image data and the right-eye image data. This scheme equals to a video signal in the stereoscopic image display scheme called the "phase difference plate scheme" described earlier, and signal processing in a display unit of a sink device is the simplest; however, a vertical resolution becomes half that of an original signal.

Figure 12:
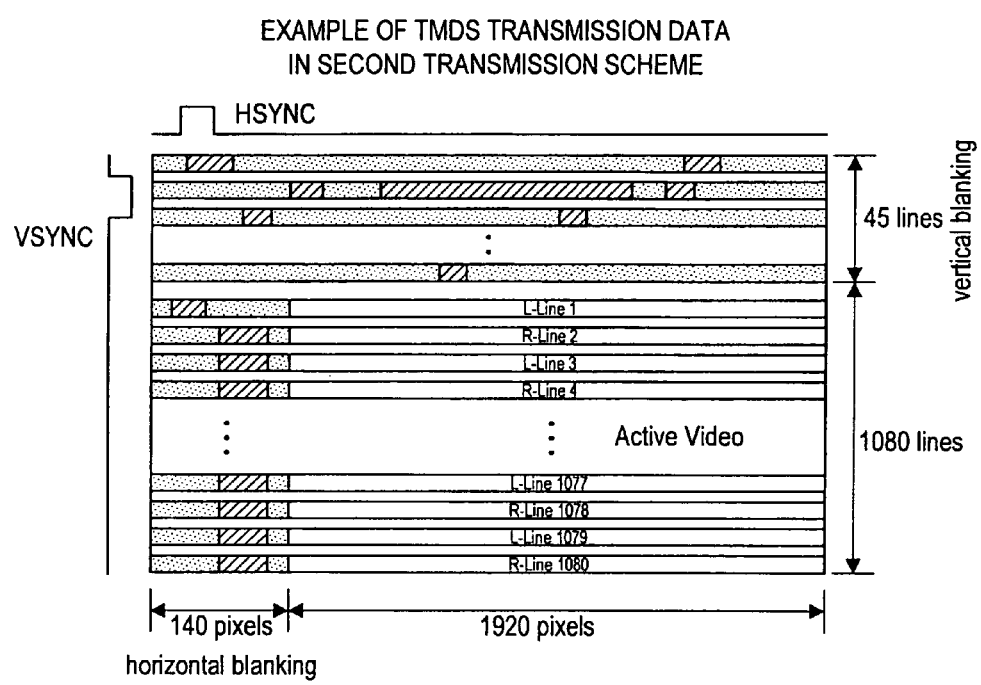
FIG. 12 is a view showing an example of TMDS transmission data in the scheme that transmits one line of left-eye image data and one line of right-eye image data alternately with one another.

FIG. 12 shows exemplary TMDS transmission data in the second transmission scheme. In this scheme, data (composite data of left-eye (L) image data and right-eye (R) image data) of active pixels in 1920 pixels by 1080 lines are placed in the active video period in 1920 pixels by 1080 lines. In the case of the second transmission scheme, lines in the vertical directions are reduced to ½ respectively in the left-eye image data and the right-eye image data as described above. The left-eye image data to be transmitted is in either odd-number lines or even-number lines, and the right-eye image data to be transmitted is also in either odd-number lines or even-number lines.

Figure 10C:
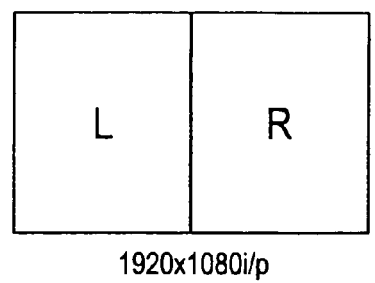
FIG. 10C is a view to describe a scheme that transmits pixel data of left-eye image data in the first half in the horizontal direction and then transmits pixel data of right-eye image data in the last half in the horizontal direction, respectively, which is a 3D (stereoscopic) image data transmission scheme.

The third transmission scheme is a scheme that transmits pixel data of left-eye image data in the first half in the horizontal direction and then transmits pixel data of right-eye image data in the last half in the horizontal direction as shown in FIG. 10(c), which is a "side-by-side" scheme that is currently used in experimental broadcast. In this scheme, pixel data in the horizontal direction is reduced to ½ respectively in the left-eye image data and the right-eye image data. The third transmission scheme can be implemented even in a source device incompatible with stereoscopic image data by outputting data as existing 2D image data, and the scheme thus has high compatibility with a source device used hitherto.

Figure 13:
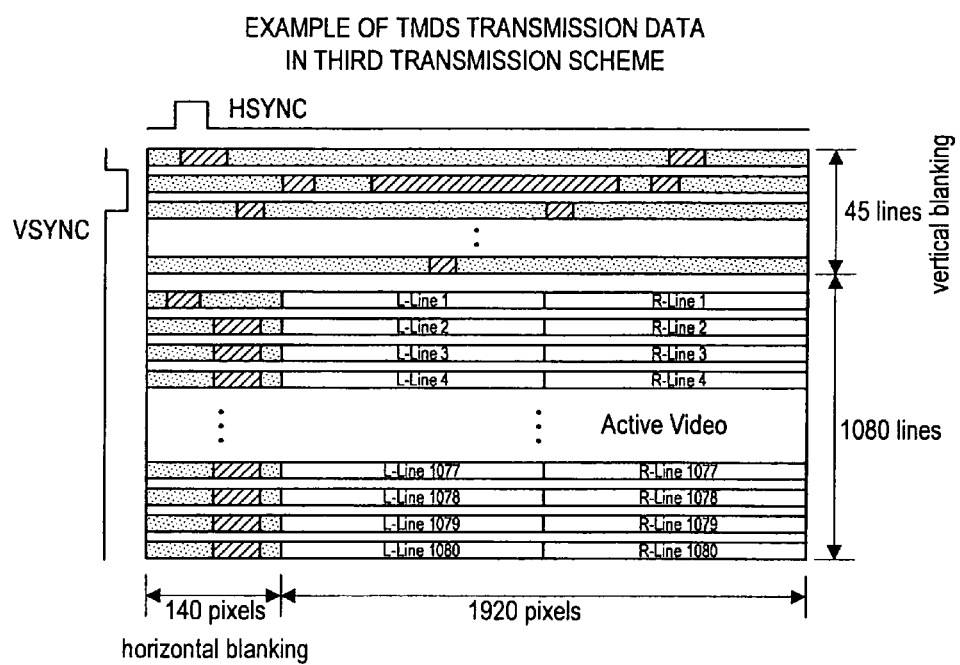
FIG. 13 is a view showing an example of TMDS transmission data in the scheme that transmits pixel data of left-eye image data in the first half in the horizontal direction and then transmits pixel data of right-eye image data in the last half in the horizontal direction.

FIG. 13 shows exemplary TMDS transmission data in the third transmission scheme. In this scheme, data (composite data of left-eye (L) image data and right-eye (R) image data) of active pixels in 1920 pixels by 1080 lines are placed in the active video period in 1920 pixels by 1080 lines. In the case of the third transmission scheme, pixel data in the horizontal direction is reduced to ½ respectively in the left-eye image data and the right-eye image data as described above.

[Screen Size Information]

The game machine 210 in the AV system 200 shown in FIG. 1 uses screen size information of the TV set 250 when generating stereoscopic image data for displaying a game image or when correcting existing stereoscopic image data of contents such as a movie.

In this embodiment, the game machine 210 acquires information related to a screen size from the TV set 250 and obtains screen size information from the acquired information. The game machine 210 acquires information related to a screen size by reading enhanced extended display identification data (E-EDID) from the TV set 250. In other words, the TV set 250 adds information related to a screen size to the E-EDID and thereby supplies the information to the game machine 210.

The E-EDID also contains information of a format (resolution, frame rate, aspect etc.) of image data that is handled in the TV set 250. The game machine 210 acquires information of a format (resolution, frame rate, aspect etc.) of image data with which the TV set 250 is compatible from the E-EDID. The game machine 210 then sets a format of image data to be transmitted to the TV set 250 to the format with which the TV set 250 is compatible.

[Information Related to Screen Size]

Figure 14:
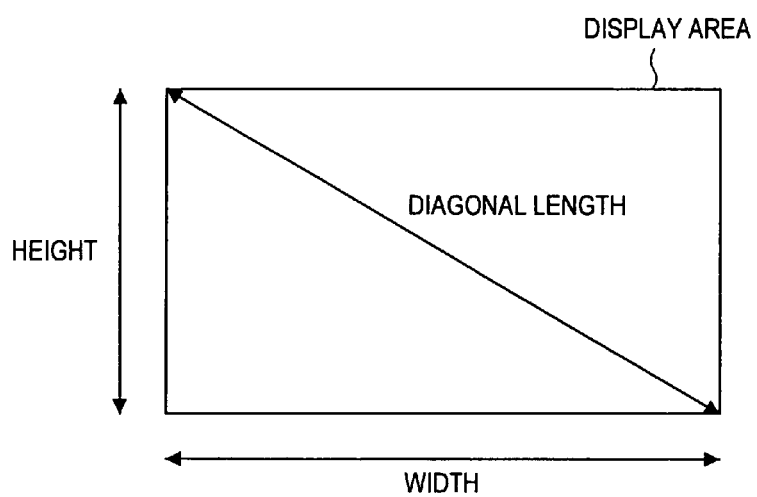
FIG. 14 is a view to describe that a screen size is a width, a height, a diagonal length or the like of an area where a left-eye image and a right-eye image are actually displayed.

A screen size is a width, a height, a diagonal length or the like of an area (display area) where a left-eye image and a right-eye image are actually displayed as shown in FIG. 14. The information related to a screen size may be the following (1) to (3), for example.

(1) Information about the effective display size of a panel in the case of a TV set using a display panel such as a liquid crystal display (LCD) or a plasma display panel (PDP). The information is a fixed value for each TV set. In this case, a source device generates a 3D video on the assumption that an output video will be displayed on the whole area of the display panel.

(2) Information about the size of an area where an image is actually displayed when displaying an image of 16:9 full HD (1920×1080 dots). The information is a fixed value for each TV set. In this case also, a source device generates a 3D video on the assumption that an output video will be displayed on the whole area of the display panel, as in the above case (1).

(3) Information about the size of an area where an image is actually displayed when displaying an image of each display resolution and aspect (1920×1080/16:9, NTSC:720×480/4:3 etc.). The information is a variable value for each resolution and aspect.

In the above cases (1) to (3), values that represent a width, a height and a diagonal length of an area in centimeters, inches or the like are the information related to a screen size. In these cases, the information related to a screen size directly indicates a screen size.

It should be noted that values from which the size of an area in the above (1) to (3) is indirectly obtained, such as the number of dots corresponding to 10 cm, for example, may be used as the information related to a screen size.

Further, in the case where the information related to a screen size depends on a resolution and an aspect as in the above case (3), a list of information related to a screen size with respect to each resolution and aspect with which the TV set 250 is compatible may be supplied from the TV set 250 to the game machine 210. Further, in the case where the information related to a screen size depends on a resolution and an aspect as in the above case (3), information of a resolution and an aspect for display may be transmitted from the game machine 210 to the TV set 250 over a CEC control data line, and then information related to a screen size corresponding to the resolution and the aspect may be transmitted from the TV set 250 to the game machine 210.

For example, the diagonal length of an area (actual size) where an image is actually displayed when an image of 16:9 full HD (1920×1080 dots) is fully displayed may be set to the above-described E-EDID as the information related to a screen size in the TV set 250. In this case, the length is set in inches as follows, for example. The length is set in inches because the screen size of a TV set (TV) is often designed according to the inch size.

32" TV: 32 inches
40" TV: 40 inches
52" TV: 52 inches
200" projector: 200 inches Further, for example, the width of an area (actual size) where an image is actually displayed when an image of 16:9 full HD (1920×1080 dots) is fully displayed may be set to the above-described E-EDID as the information related to a screen size in the TV set 250. In this case, the width is set in centimeters (or 0.25 cm or mm) as follows, for example.

32" TV: 71 cm
40" TV: 88 cm
52" TV: 115 cm
200" projector: 442 cm

If the size of a display area is large to some extent, a value indicating "sufficiently large" may be set to the above-described E-EDID as the information related to a screen size. Thus, in the case where the size of an actual display area in a projector is unknown, for example, the value indicating "sufficiently large" (e.g. 255) may be set.

[Structure of E-EDID]

Figure 15:
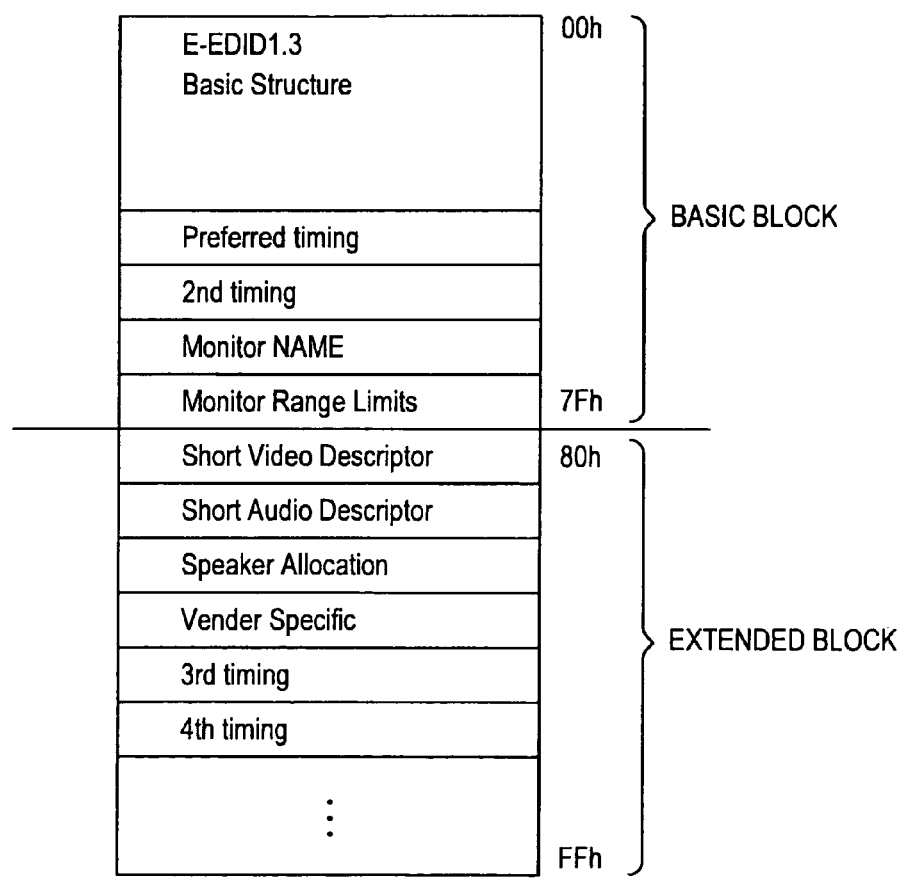
FIG. 15 is a view showing an exemplary structure of E-EDID data.

FIG. 15 shows an example of a data structure of E-EDID. The E-EDID is made up of a basic block and an extended block. At the head of the basic block, data defined by E-EDID 1.3 standard which is represented by "E-EDID 1.3 Basic Structure" exists, followed by timing information for maintaining compatibility with EDID used hitherto which is represented by "Preferred timing" and timing information, different from "Preferred timing", for maintaining EDID used hitherto which is represented by "2nd timing".

Further, in the basic block, "2nd timing" is followed by information indicative of the name of a display apparatus which is represented by "Monitor NAME" and information indicative of the number of displayable pixels when the aspect ratio is 4:3 and 16:9 which is represented by "Monitor Range Limits", sequentially in this order.

At the head of the extended block, data describing information indicative of a displayable image size (resolution), a frame rate and interlaced/progressive and information such as an aspect ratio which is represented by "Short Video Descriptor", data describing information such as a reproducible audio codec, a sampling frequency, a cutoff frequency or a codec bit count which is represented by "Short Audio Descriptor" and information related to right and left loudspeakers which is represented by "Speaker Allocation", sequentially in this order.

Further, in the extended block, "Speaker Allocation" is followed by data uniquely defined for each maker which is represented by "Vender Specific," timing information for maintaining compatibility with EDID used hitherto which is represented by "3rd timing", and timing information for maintaining compatibility with EDID used hitherto which is represented by "4th timing".

FIG. 16 shows an example of video data in the Short Video Descriptor region. In Byte #1 to Byte #L in the Short Video Descriptor region, formats displayable by a receiving apparatus (the TV set 250 in this embodiment) among video signal formats defined by CEA-861-D are described in a combination of a resolution, a frame rate and an aspect (aspect ratio).

FIG. 17 shows an example of a data structure of the Vendor Specific region (HDMI Vendor Specific Data Block). The Vendor Specific region has the 0th block to the N-th block, each being one byte long, are placed.

The 0th block placed at the head of data represented by "Vendor Specific" contains a header indicative of a data area of the data "Vendor Specific" which is represented by "Vendor-Specific tag code (=3)" and information indicative of a length of the data "Vendor Specific" which is represented by "Length (=N)".

Further, the first to third blocks contain information indicative of a number "0x000C03" registered for HDMI(R) which is represented by "24-bit IEEE Registration Identifier (0x000C03) LSB first". The fourth and fifth blocks contain information indicative of the physical address of a sink device of 24 bits which is represented by "A", "B", "C" and "D", respectively.

The sixth block contains a flag indicative of a function with which the sink device is compatible which is represented by "Supports_AI", information specifying the number of bits per pixel which is represented by "DC_48 bit", "DC_36 bit" and "DC_30 bit" a flag indicative of the compatibility of the sink device with the transmission of an image of YCbCr4:4:4 which is represented by "DC_Y444", and a flag indicative of the compatibility of the sink device with dual digital visual interface (DVI) which is represented by "DVI_Dual".

The seventh block contains information indicative of the maximum frequency of a TMDS pixel clock which is represented by "Max_TMDS_Clock". The eighth block contains a flag indicative of the presence or absence of video and audio latency information which is represented by "Latency" in the sixth bit and the seventh bit.

The ninth block contains progressive video latency time data which is represented by "Video_Latency", and the tenth block contains audio latency time data accompanying a progressive video which is represented by "Audio_Latency". The eleventh bock contains interlaced video latency time data which is represented by "Interlaced_Video_Latency". The twelfth block contains audio latency time data accompanying an interlaced video which is represented by "Interlaced_Audio_Latency".

In this embodiment, the eighth block has a flag indicative of the presence or absence of information related to a screen size in the fifth bit. The flag is set to "1", and the above-described information related to a screen size is contained in the thirteenth block.

[Output of Stereoscopic Image Data]

When transmitting stereoscopic image data to the TV set 250, the game machine 210 outputs and transmits stereoscopic image data suited for a screen size obtained from information related to a screen size that is acquired from the TV set 250 as described above.

As described above, at the time of displaying a game image, the game machine 210 dynamically generates stereoscopic image data based on screen size information and outputs the data. Further, by using visual distance information in addition to the screen size information, it is possible to generate the stereoscopic image data (left-eye image data and right-eye image data) with an absolutely precise visual distance. The visual distance is a distance from a viewer to a screen.

As described above, the game machine 210 is able to obtain the screen size information from information related to a screen size that is acquired from the TV set 250 as described above, and automatic acquisition is available without user's setting. When the information related to a screen size acquired from the TV set 250 is the value indicating "sufficiently large" described above, a sufficiently large value that is set in advance is used as a screen size (width and height).

As for the visual distance information, automatic acquisition is not available and user's manual setting is necessary in the game machine 210. In this embodiment, the game machine 210 includes a visual distance adjustment unit that sets a recommended visual distance obtained on the basis of the screen size of the TV set 250 as a default value. The recommended visual distance of the TV set is two to three times the lengthwise size, for example. A user adjusts a visual distance in visual distance adjustment mode by operating the control pad 217, for example. In this case, a GUI screen for visual distance adjustment is displayed on the display panel 262 of the TV set 250, for example, and a user performs adjustment (setting) of a visual distance with use of the GUI screen.

In the case where a user does not make operation for visual distance adjustment, the game machine 210 uses the default value as it is. In this manner, the default value may be used without change, and only a user who desires to make adjustment to an optimum value makes manual setting, so that user's burden for setting can be reduced. Further, because the default value is an appropriate value to a certain degree, the visual distance can be easily adjusted to a more suitable value compared to the case where a user sets a visual distance from scratch.

Figure 18:
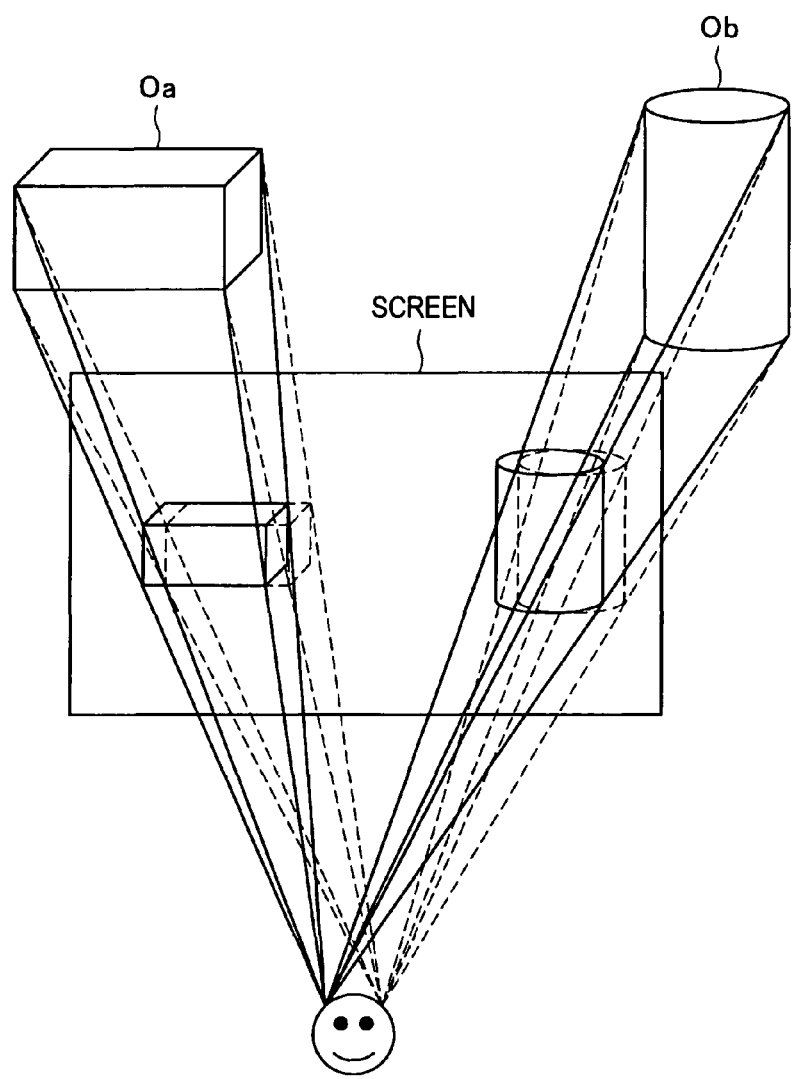
FIG. 18 is a view to describe modeling processing when generating stereoscopic image data.
Figure 19:
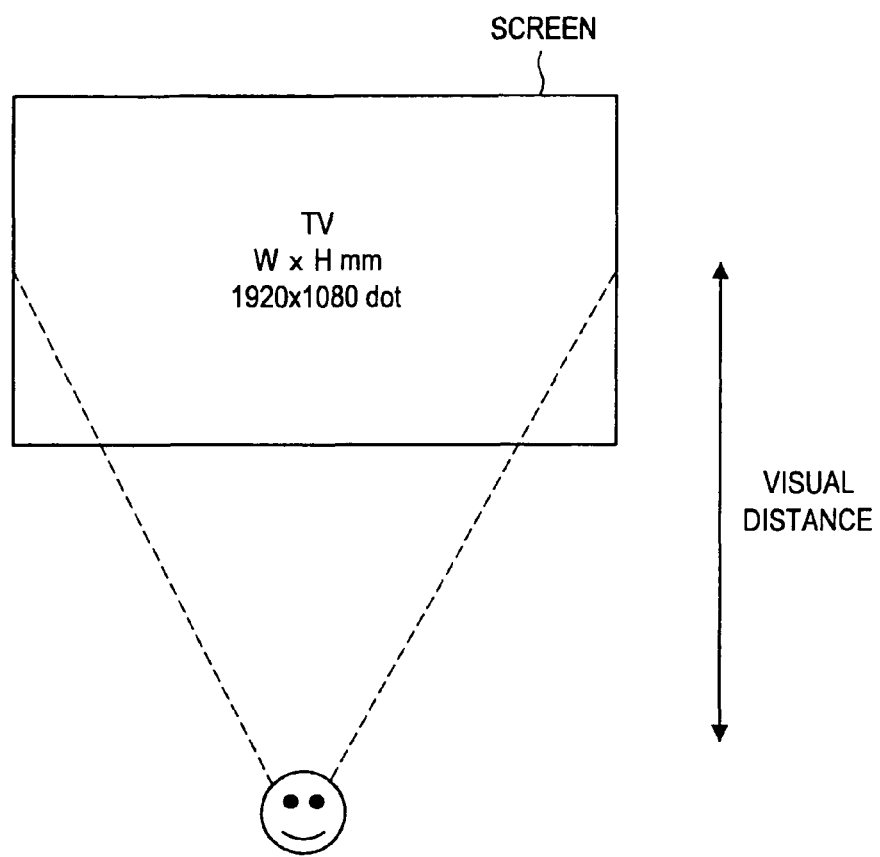
FIG. 19 is a view to describe use of a screen size and a visual distance as a parameter when generating stereoscopic image data.

A flow of generation and output of stereoscopic image data (3D CG) of a game image is briefly described. When generating stereoscopic image data, a 2D image (left-eye image and right-eye image) is created by modeling in a 3D (three-dimensional) space and projection onto a 2D (two-dimensional) screen as shown in FIG. 18. In the example of modeling shown in FIG. 18, a rectangular solid object Oa and a cylindrical column object Ob are placed at the back of the screen plane. In this case, with use of a screen size and a visual distance as parameters, a 2D image (left-eye image and right-eye image) with an accurate visual distance can be created.

Figure 20:
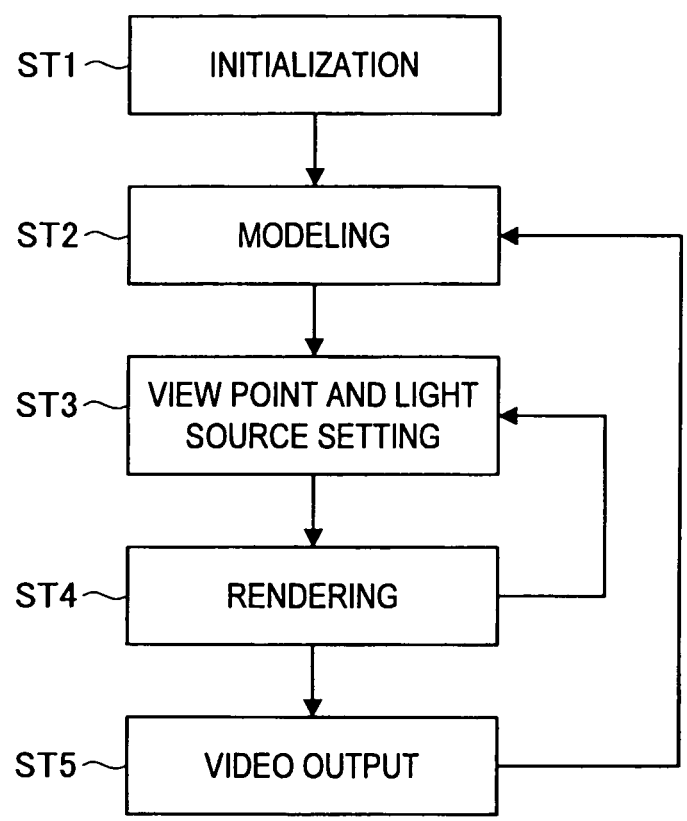
FIG. 20 is a flowchart schematically showing a flow of generation and output process of stereoscopic image data in a game machine.

The flowchart of FIG. 20 schematically shows a flow of the stereoscopic image data generation and output process in the game machine 210. First, in step ST1, the game machine 210 performs initialization. In this step, the game machine 210 performs various kinds of initialization processing including initialization of various kinds of library and memory, setting of the VRAM (frame buffer) 225 and output setting.

Next, in step ST2, the game machine 210 performs modeling. In the modeling processing, the rendering processing unit 224 calculates each vertex data of a rendering target in each frame. A model of each object is thereby built. Then, data of each vertex to be rendered is calculated in a "model coordinate system" ("local coordinate system") for each object. Further, each object to be rendered is placed in the space of a "world coordinate system". Specifically, the vertex data of each object of a rendering target calculated in the "model coordinate system" is arranged into the "world coordinate system".

Then, the game machine 210 performs setting of a view point and a light source in step ST3 and further performs rendering in step ST4, thereby generating left and right image data. The setting of a view point is important when generating stereoscopic image data. In these steps, the rendering processing unit 224 performs the view point and light source setting and the rendering on a left-eye image to thereby generate left-eye image data and then performs view point and light source setting and rendering on a right-eye image to thereby generate right-eye image data.

The view point and light source setting process performs setting of a view point position and direction. In the "world coordinate system" in which objects to be rendered are arranged, a point of view, a point of regard, an upward vector (specifying which direction is the upward direction of a camera to determine a view point position), an angle of view of a camera and an aspect of a camera are set. In this step, the coordinates of a point of view for left eye and right eye are determined with an interpupillary distance apart. As the point of regard, the same point is specified for left eye and right eye. As the upward vector, the same direction is specified for left eye and right eye in such a way that the left eye and the right eye are arranged horizontally.

As for the angle of view (viewing angle) of a camera, an angle of view calculated from the screen size and the visual distance of the TV set 250 is specified. In this case, a height and a width as the screen size are calculated based on the information related to a screen size that is acquired from the TV set 250. As for the visual distance, a value set by a user, a recommended visual distance on the basis of the screen size (e.g. two to three times the screen height) or the like is used.

In the case of specifying an angle of view in the lengthwise direction as the angle of view of a camera, an angle of view in an actual viewing environment can be obtained from the height of the screen size and the visual distance. In the case of specifying an angle of view in the crosswise direction as the angle of view of a camera, an angle of view in an actual viewing environment can be obtained from the width of the screen size and the visual distance. As the aspect of a camera, an aspect of an output image is specified. For example, the aspect is set to 16:9 when outputting an image with full HD (1920×1080 16:9).

Figure 21:
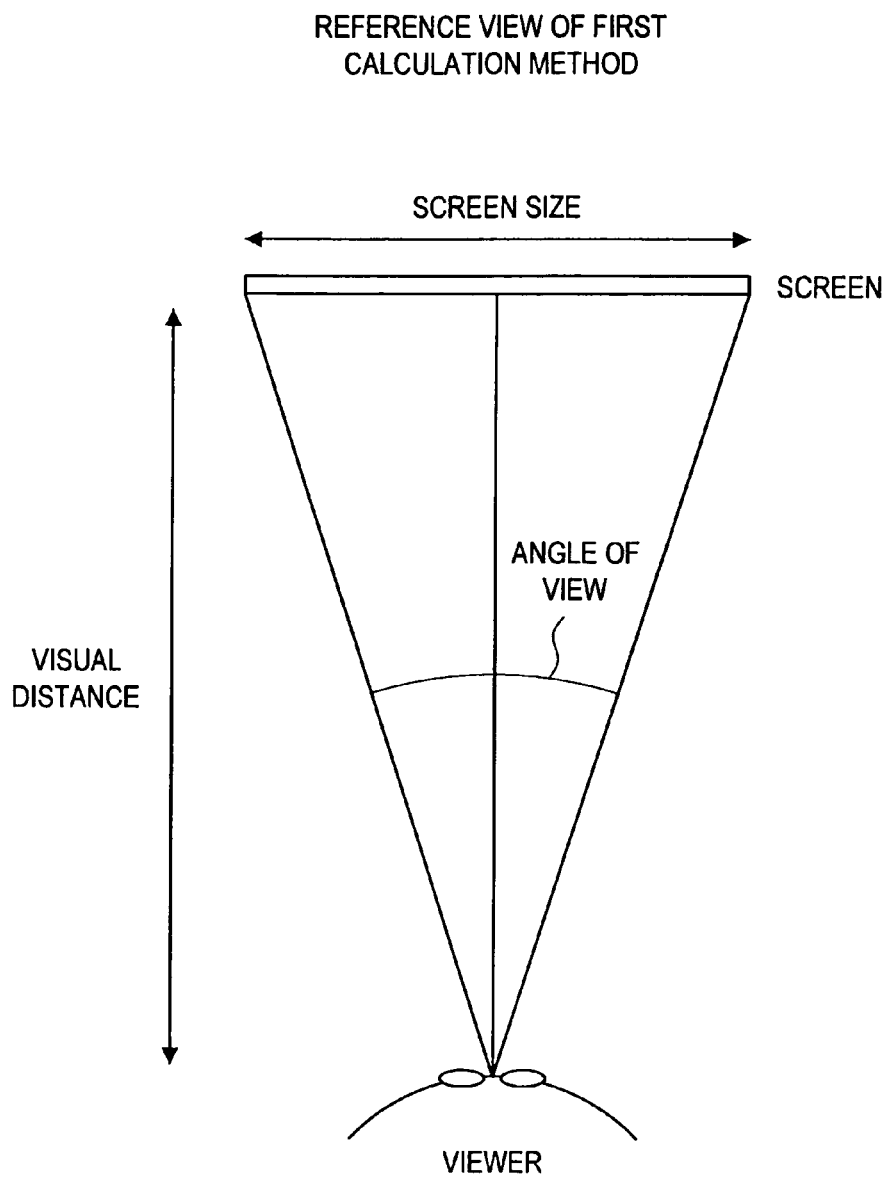
FIG. 21 is a reference view to describe a first calculation method of an angle of view and an aspect of a camera.

FIG. 21 is a reference view of a first calculation method of an angle of view and an aspect of a camera. The first calculation method can be applied when a screen size is sufficiently large compared to an interpupillary distance. A calculated value in this case is an approximate value. An angle of view can be obtained by the following expression (1) and an aspect can be obtained by the following expression (2).

$$[\text{angle of view}] = a\tan(([\text{screen size}]/2)/[\text{visual distance}]) \times 2 \quad (1)$$

$$[\text{aspect}] = [\text{aspect of output video}] \quad (2)$$

Figure 22:
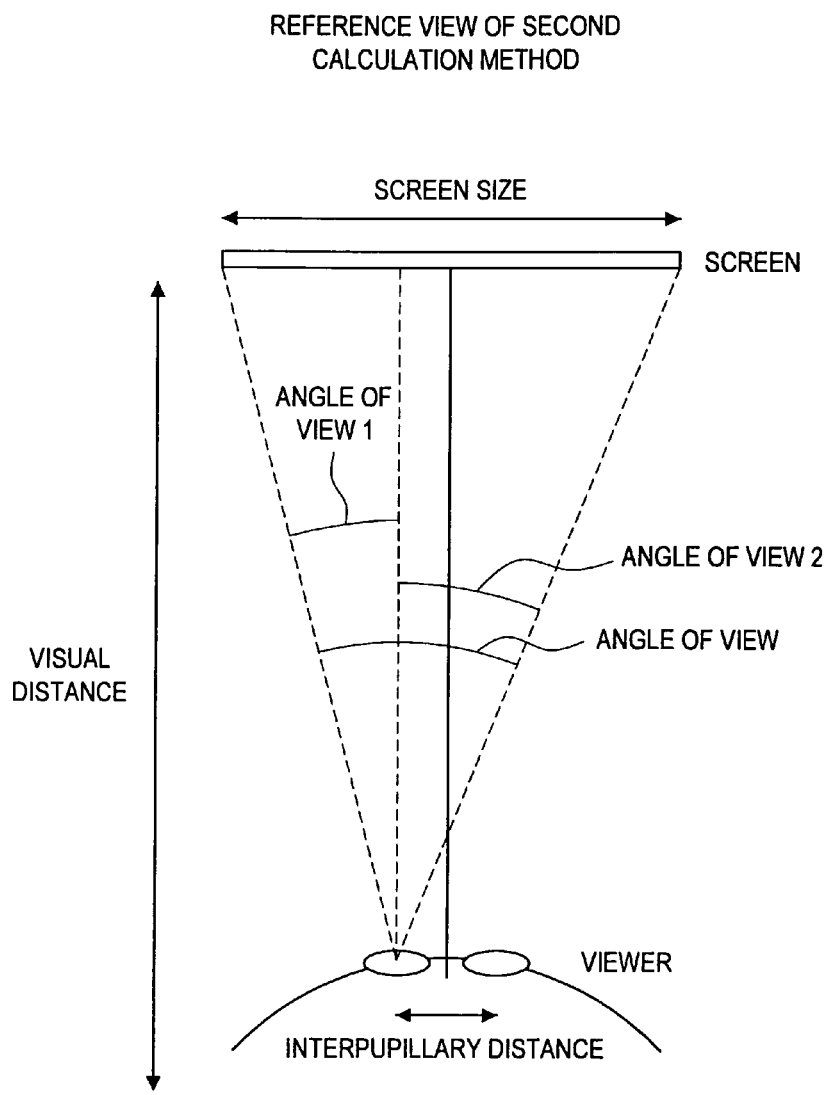
FIG. 22 is a reference view to describe a second calculation method of an angle of view and an aspect of a camera.

FIG. 22 is a reference view of a second calculation method of an angle of view and an aspect of a camera. In the second calculation method, more accurate values of an angle of view and an aspect can be obtained. In this case, an angle of view 1 can be obtained by the following expression (3), and an angle of view 2 can be obtained by the following expression (4). Then, an angle of view can be obtained by the following expression (5) as a sum of the angle of view 1 and the angle of view 2.

$$[\text{angle of view 1}] = \atan(([\text{screen size}]/2 - [\text{interpupillary distance}]/2)/[\text{visual distance}]) \quad (3)$$

$$[\text{angle of view 2}] = \atan(([\text{screen size}]/2 + [\text{interpupillary distance}]/2)/[\text{visual distance}]) \quad (4)$$

$$\begin{aligned}[\text{angle of view}] &= [\text{angle of view 1}] + [\text{angle of view 2}] \\ &= \atan(([\text{screen size}]/2 - \\ &\quad [\text{interpupillary distance}]/2)/[\text{visual distance}]) + \\ &\quad \atan(([\text{screen size}]/2 + \\ &\quad [\text{interpupillary distance}]/2)/[\text{visual distance}])\end{aligned} \quad (5)$$

If an aspect of a camera to be specified is [width]/[length], the aspect (width/length) can be obtained by the following expression (6).

$$\begin{aligned}[\text{aspect (width/length)}] &= \cos([\text{angle of view 2}] - \\ &\quad [\text{angle of view 1}]) * \\ &\quad [\text{aspect of output video(width/length)}] \\ &= \cos(\atan(([\text{screen size}]/2 + \\ &\quad [\text{interpupillary distance}]/2)/ \\ &\quad [\text{visual distance}]) - \\ &\quad \atan(([\text{screen size}]/2 - \\ &\quad [\text{interpupillary distance}]/ \\ &\quad 2)/[\text{visual distance}])) * \\ &\quad [\text{aspect of output video (width/length)}]\end{aligned} \quad (6)$$

Further, if an aspect of a camera to be specified is [length]/[width], the aspect (length/width) is the inverse of the expression (6).

In the rendering process, texture mapping, depth test, alpha test, stencil test, blending, various kinds of effect processing and so on are performed so as to generate left-eye image data and right-eye image data corresponding to a final image to be displayed, and the data is expanded (rendered) in the VRAM 225.

Finally, in step ST5, the game machine 210 reads the left-eye image data and the right-eye image data expanded (rendered) in the VRAM (frame buffer) 225 and transmits the data from the HDMI transmitting unit 212 to the TV set 250. At this time, the position and the size of the left-eye image data and the right-eye image data are converted in conformity to the standard of output image data as appropriate and then supplied to the HDMI transmitting unit 212 and transmitted.

Further, as described above, in the case of reproducing contents such as a movie and when reproduced image data is stereoscopic image data and a user gives an instruction to perform correction, the game machine 210 corrects the stereoscopic image data based on the screen size information and then outputs the data. Besides the game machine, a motion video playback apparatus such as a Blu-ray Disc player may be used when correcting and reproducing video contents in this manner.

The rendering processing unit 224 of the game machine 210 performs correction by detecting depth information from the reproduced stereoscopic image data (left-eye image data and right-eye image data). At this time, the rendering processing unit 224 analyzes the left-eye image data and the right-eye image data making up the reproduced stereoscopic image data, extracts a feature point and detects a correlation between the left-eye image and the right-eye image, thereby estimating depth information. After estimating the depth information, the rendering processing unit 224 corrects the left-eye image data and the right-eye image data based on the screen size and the visual distance of the TV set 250.

A flow of the stereoscopic image data correction and output process in the game machine 210 is described hereinbelow. The rendering processing unit 224 first estimates depth information. Specifically, the rendering processing unit 224 analyzes left-eye (L) image data and right-eye (R) image data that make up the reproduced stereoscopic image data and obtains a correlation between the L image and the R image. It can be assumed that the upward vector of a camera is identical in the L image and the R image captured for displaying a stereoscopic image.

Figure 23:
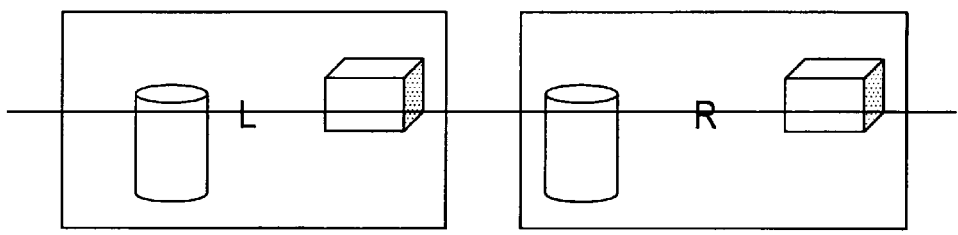
FIG. 23 is a view to describe that a correlation between an L image and an R image when estimating depth information is obtained with respect to a line in the horizontal direction.

Therefore, a correlation between the L image and the R image is obtained with respect to each line in the horizontal direction as shown in FIG. 23. At this time, a correlation can be obtained by using luminance and color information, image information after filtering (edge detection) such as differentiation of luminance and color or the like, and displacement between left and right can be obtained with respect to each area and each point of the image. Further, if information such as a distance between twin lenses and a lens angle can be used as camera shooting conditions, depth information of each area and each point can be estimated accurately from the camera position and angle information and the displacement information between left and right in each area and each point.

Figure 24:
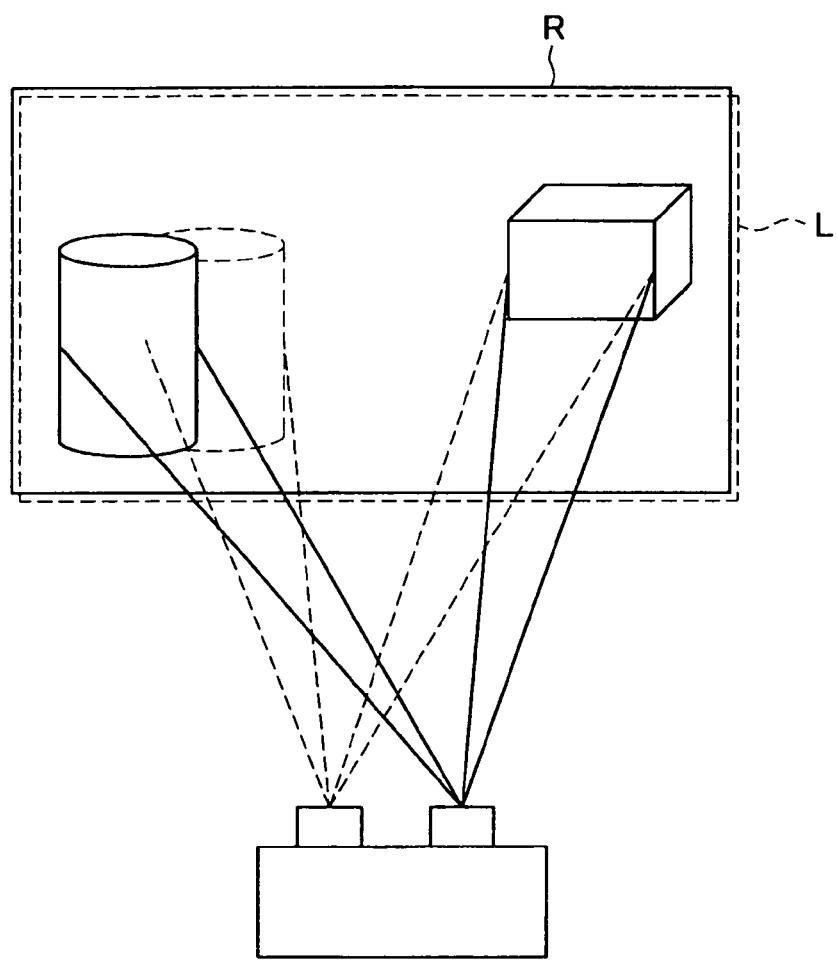
FIG. 24 is a view to describe estimation of depth information.

In the case shown in FIG. 24, as for a cylindrical object, left and right lines of sight cross each other at the front of the reference plane (screen plane). It is thus found that the cylindrical object exists at the front of the screen plane. In this case, a depth can be also obtained by calculation. Further, as for a rectangular object, left and right lines of sight cross each other on the screen plane. It is thus found that the rectangular object exists at the position of the reference plane (screen plane).

The depth information of the image can be represented as shown in FIG. 25. Specifically, the cylindrical object exists at the front of the reference plane, and the rectangular object exists at the position of the reference plane. Further, it can be assumed that the position of the object is between the left and right areas.

Next, the rendering processing unit 224 performs correction of the L and R image data in the same manner as the process flow of generating the game image described earlier. At this time, the rendering processing unit 224 sets the object position and depth information obtained by estimation in the modeling and then performs the view point and light source setting, the rendering and the video output in the same manner as when generating the game image described earlier. It is thereby possible to correct the L and R image data of the reproduced stereoscopic image data, which is the existing stereoscopic image data, according to the screen size and the visual distance of the TV set 250 and then transmit the data from the HDMI transmitting unit 212 to the TV set 250.

Figure 26:
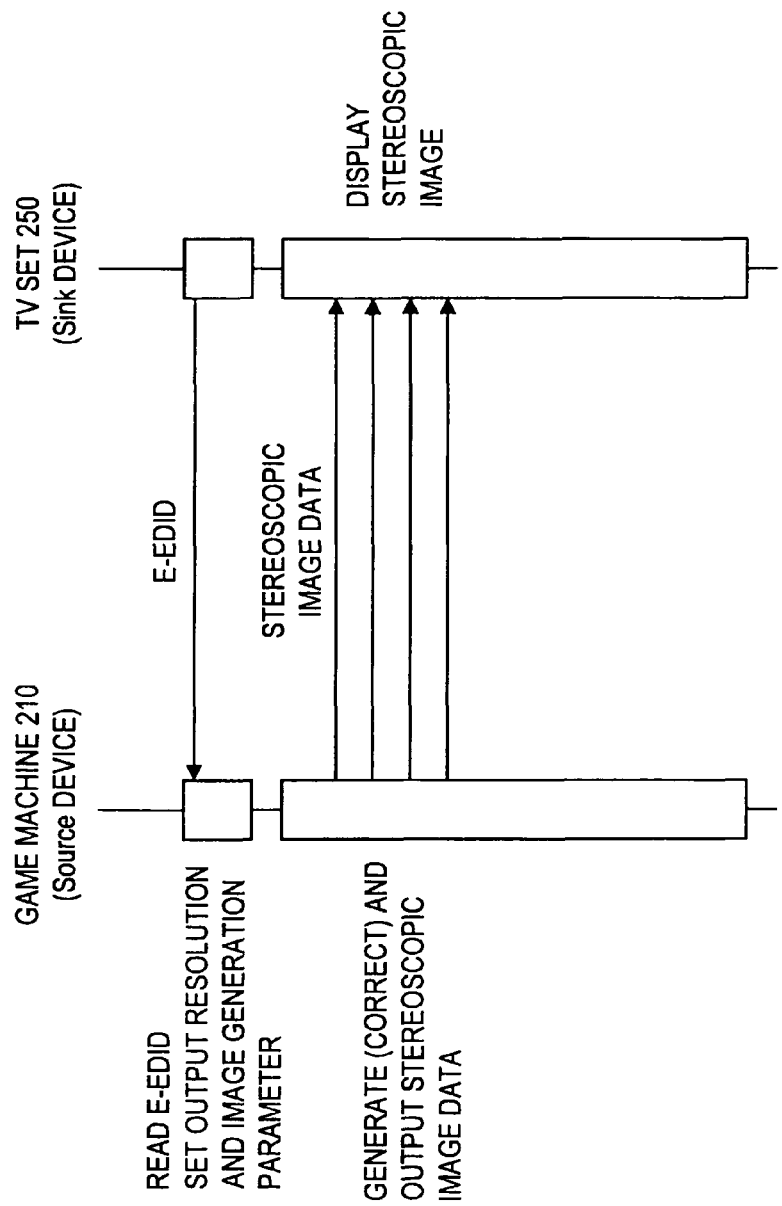
FIG. 26 is a view schematically showing a sequence when transmitting stereoscopic image data (left-eye image data and right-eye image data) for displaying a stereoscopic image from a game machine to a TV set.

FIG. 26 schematically shows a sequence when transmitting stereoscopic image data (left-eye image data and right-eye image data) for displaying a stereoscopic image from the game machine 210 to the TV set 250. Prior to transmission of the stereoscopic image data, the game machine 210 reads and acquires the E-EDID (cf. FIGS. 15 to 17) from the TV set 250.

The game machine 210 obtains format information of image data with which the TV set 250 is compatible, screen size information of the TV set 250 or the like that are contained in the E-EDID and thereby sets an output resolution and further sets image generation parameters such as a screen size and a visual distance for generating or correcting stereoscopic image data.

After that, the game machine 210 generates or corrects stereoscopic image data with use of the set parameters and transmits the data to the TV set 250. The TV set 250 receives the stereoscopic image data transmitted from the game machine 210 and displays the stereoscopic image.

As described above, in the AV system 200 shown in FIG. 1, information related to a screen size is acquired from the TV set 250 in the game machine 210. Then, in the game machine 210, stereoscopic image data suited for the screen size is generated or existing stereoscopic image data is corrected to be suited for the screen size. Then, the generated or corrected stereoscopic image data is transmitted from the game machine 210 to the TV set 250. Further, in the TV set 250, a left-eye image and a right-eye image that present a stereoscopic image are displayed on the basis of the stereoscopic image data suited for the screen size transmitted from the game machine 210. It is thereby possible to display the stereoscopic image suited for the screen size without increasing user's workload.

Further, in the AV system 200 shown in FIG. 1, the screen size and visual distance information is used at the time of generating or correcting stereoscopic image data in the game machine 210. When a user does not set (adjust) a visual distance, a recommended visual distance that is obtained on the basis of the screen size is used as the visual distance in the game machine 210. It is thus possible to generate or correct stereoscopic image data without user's setting, thereby reducing user's workload.

Furthermore, in the AV system 200 shown in FIG. 1, the recommended visual distance that is obtained on the basis of the screen size is used as a default value of user setting (adjustment) in the game machine 210. A user can thereby start adjustment of a visual distance from a nearly optimum value, and it is thereby possible to efficiently adjust the visual distance.

2. Alternative Example

In the above-described embodiment, the AV system 200 in which the game machine 210 and the TV set 250 are directly connected through the HDMI cable 350 is shown. However, a configuration in which an AV amplifier, an image conversion apparatus or the like serving as a repeater device is connected between a 3D motion video playback apparatus such as the game machine 210 or a Blu-ray Disc player and the TV set 250 is also feasible.

Figure 27:
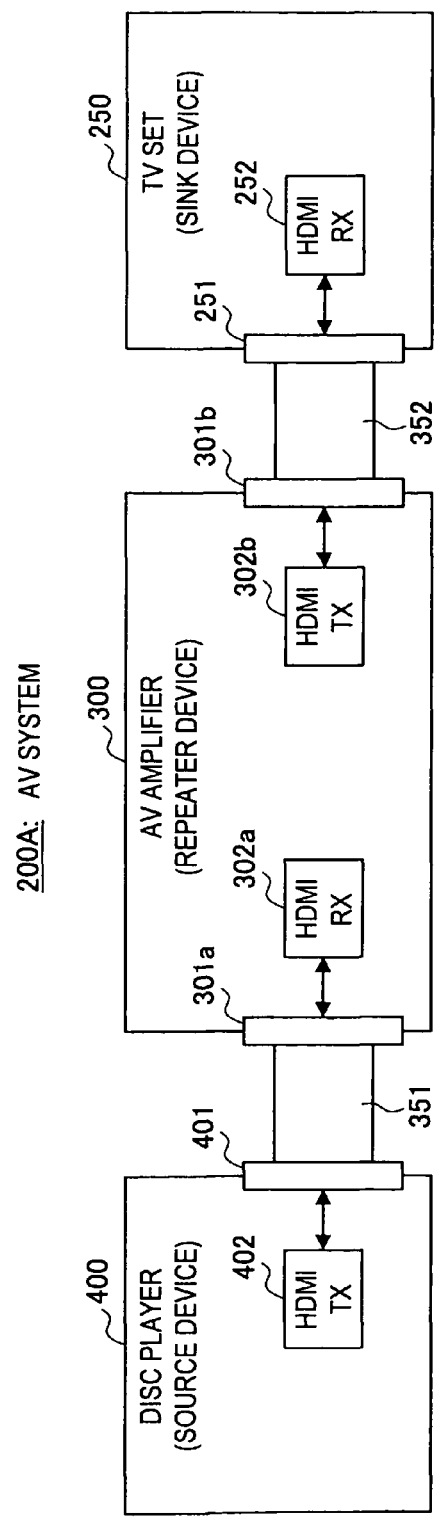
FIG. 27 is a block diagram showing an exemplary configuration of an AV system in which an AV amplifier is connected between a disc player and a TV set.

FIG. 27 shows an exemplary configuration of an AV system 200A in which an AV amplifier 300 is connected between a disc player 400 and a TV set 250. The TV set 250 is the same as the TV set 250 in the AV system 200 shown in FIG. 1. The AV system 200A includes the disc player 400 serving as a source device, the AV amplifier 300 serving as a repeater device and the TV set 250 serving as a sink device.

The disc player 400 and the AV amplifier 300 are connected through an HDMI cable 351. The disc player 400 has an HDMI terminal 401 to which an HDMI transmitting unit (HDMI TX) 402 is connected. The AV amplifier 300 has an HDMI terminal 301a to which an HDMI receiving unit (HDMI RX) 302a is connected. One end of the HDMI cable 351 is connected to the HDMI terminal 401 of the disc player 400, and the other end of the HDMI cable 351 is connected to the HDMI terminal 301a of the AV amplifier 300.

Further, the AV amplifier 300 and the TV set 250 are connected through an HDMI cable 352. The AV amplifier 300 has an HDMI terminal 301b to which an HDMI transmitting unit (HDMI TX) 302b is connected. One end of the HDMI cable 352 is connected to the HDMI terminal 301b of the AV amplifier 300, and the other end of the HDMI cable 352 is connected to the HDMI terminal 251 of the TV set 250.

[Exemplary Configuration of Disc Player]

Figure 28:
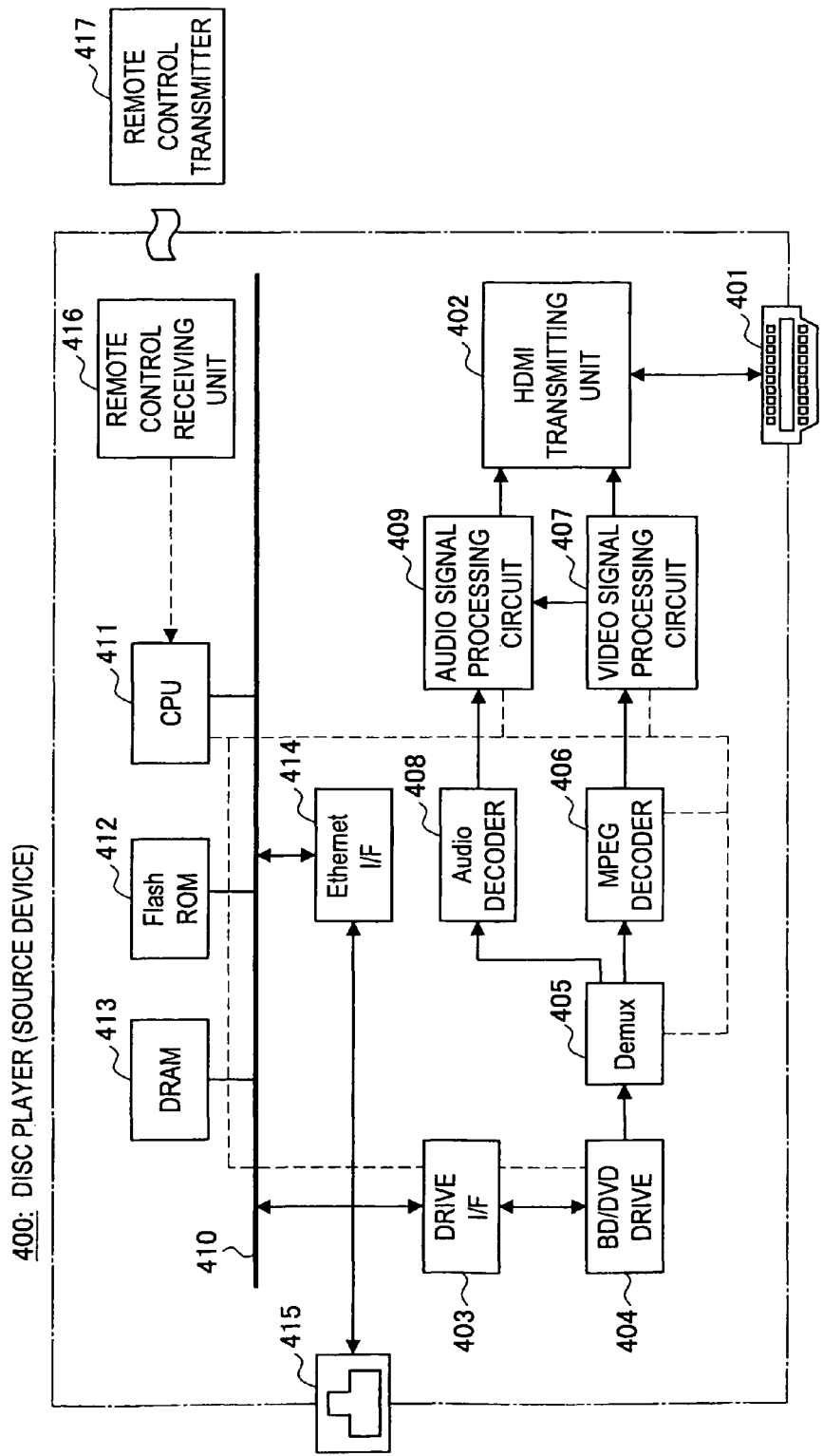
FIG. 28 is a block diagram showing an exemplary configuration of a disc player (source device) included in the AV system.

FIG. 28 shows an exemplary configuration of the disc player 400. The disc player 400 includes the HDMI terminal 401, the HDMI transmitting unit 402, a drive interface 403 and a BD/DVD drive 404. The disc player 400 further includes a demultiplexer 405, an MPEG decoder 406, a video signal processing circuit 407, an audio decoder 408 and an audio signal processing circuit 409.

The disc player 400 further includes an internal bus 410, a CPU 411, flash ROM 412 and DRAM 413. The disc player 400 further includes an Ethernet interface (I/F) 414, a network terminal 415, a remote control receiving unit 416 and a remote control transmitter 417. It should be noted that "Ethernet" is a registered trademark. The CPU 411, the flash ROM 412, the DRAM 413, the Ethernet interface 414 and the drive interface 403 are connected to the internal bus 410.

The CPU 411 controls the operation of each unit of the disc player 400. The flash ROM 412 stores control software and data. The DRAM 413 forms a work area of the CPU 411. The CPU 411 expands the software and data read from the flash ROM 412 in the DRAM 413 and starts the software, thereby controlling each unit of the disc player 400. The remote control receiving unit 416 receives a remote control signal (remote control code) transmitted from the remote control transmitter 417 and supplies it to the CPU 411. The CPU 411 controls each unit of the disc player 400 according to the remote control code.

The BD/DVD drive 404 records contents data into a BD or DVD (not shown) as a disc-shaped recording medium or reproduces contents data from the BD or DVD. The BD/DVD drive 404 is connected to the internal bus 410 via the drive interface 403.

The demultiplexer 405 separates video and audio elementary streams from reproduced data in the BD/DVD drive 404. The MPEG decoder 406 performs decoding of the video elementary stream that is separated by the demultiplexer 405 and thereby obtains non-compressed image data.

The video signal processing circuit 407 performs scaling (resolution conversion), superimposition of graphics data and so on as appropriate on the image data obtained by the MPEG decoder 406 and supplies the data to the HDMI transmitting unit 402. Further, if the image data received by the MPEG decoder 406 is stereoscopic image data (left-eye image data and right-eye image data) for displaying a stereoscopic image, the video signal processing circuit 407 processes the stereoscopic image data into the state conforming to a transmission scheme, just like the rendering processing unit 224 of the game machine 210 described earlier.

Further, if the image data received by the MPEG decoder 406 is stereoscopic image data (left-eye image data and right-eye image data) for displaying a stereoscopic image, the video signal processing circuit 407 corrects the stereoscopic image data in response to an instruction from a user. The correction of the stereoscopic image data is performed by using information of the screen size of the TV set 250 and a visual distance, just like the rendering processing unit 224 of the game machine 210 described earlier.

The audio decoder 408 performs decoding of the audio elementary stream that is separated by the demultiplexer 405 and thereby obtains non-compressed audio data. The audio signal processing circuit 409 performs tone control or the like as appropriate on the audio data obtained by the audio decoder 408 and supplies the data to the HDMI transmitting unit 402.

The HDMI transmitting unit 402 transmits baseband image (video) and audio data from the HDMI terminal 401 by communication in conformity to the HDMI standard. The HDMI transmitting unit 402 is configured in the same manner as the HDMI transmitting unit 212 of the game machine 210 described earlier.

The operation of the disc player 400 shown in FIG. 28 when reproducing contents such as a movie is described hereinbelow.

Reproduced data of the DVD/BD drive 219 is supplied to the demultiplexer 405 and separated into video and audio elementary streams. The video elementary stream separated by the demultiplexer 405 is supplied to the MPEG decoder 406 and decoded, so that non-compressed image data is obtained. The audio elementary stream separated by the demultiplexer 405 is supplied to the audio decoder 408 and decoded, so that non-compressed audio data is obtained.

The image data obtained by the MPEG decoder 406 is supplied to the HDMI transmitting unit 402 via the video signal processing circuit 407. The audio data obtained by the audio decoder 408 is supplied to the HDMI transmitting unit 402 via the audio signal processing circuit 409. Then, the image data and the audio data are sent out from the HDMI terminal 401 to the HDMI cable over TMDS channels of HDMI.

The image data and the audio data that are supplied from the video signal processing circuit 407 and the audio signal processing circuit 409 to the HDMI transmitting unit 402 are packaged in the HDMI transmitting unit 402 and output to the HDMI terminal 401. If the image data is stereoscopic image data (left-eye image data and right-eye image data), the stereoscopic image data is processed into the state conforming to a transmission scheme by the video signal processing circuit 407 and then supplied to the HDMI transmitting unit 402.

[Exemplary Configuration of AV Amplifier]

Figure 29:
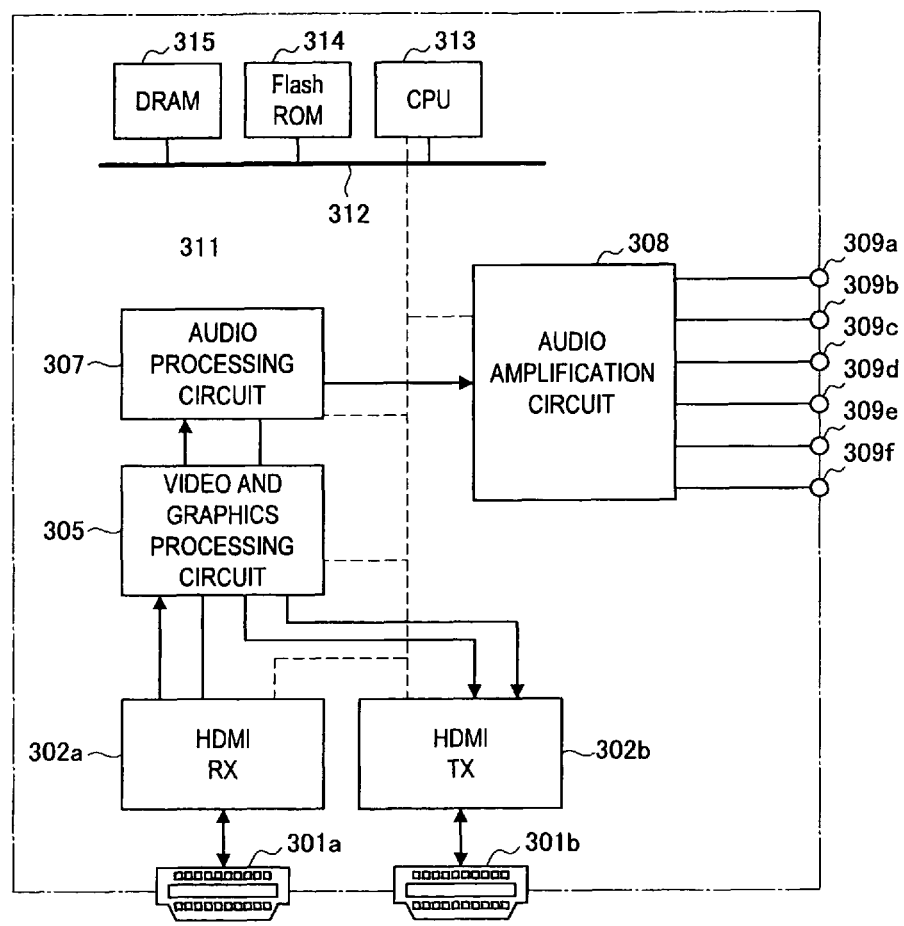
FIG. 29 is a block diagram showing an exemplary configuration of an AV amplifier (repeater device) included the AV system.

FIG. 29 shows an exemplary configuration of the AV amplifier 300. The AV amplifier 300 includes the HDMI terminals 301a and 301b, the HDMI receiving unit 302a and the HDMI transmitting unit 302b. The AV amplifier 300 further includes a video and graphics processing circuit 305, an audio processing circuit 307, an audio amplification circuit 308 and audio output terminals 309a to 309f. The AV amplifier 300 further includes an internal bus 312, a CPU 313, flash ROM 314 and DRAM 315.

The HDMI receiving unit 302a receives non-compressed video (image) and audio data that are supplied to the HDMI terminal 301a through the HDMI cable 351 by communication in conformity to the HDMI standard. Although not described in detail, the HDMI receiving unit 302a has the same configuration as the HDMI receiving unit 252 of the TV set 250 in the AV system 200 shown in FIG. 1.

The HDMI transmitting unit 302b sends out the non-compressed video (image) and audio data from the HDMI terminal 301b to the HDMI cable 352 by communication in conformity to the HDMI standard. Although not described in detail, the HDMI transmitting unit 302b has the same configuration as the HDMI transmitting unit 212 of the game machine 210 in the AV system 200 shown in FIG. 1.

The audio processing circuit 307 performs processing of generating audio data of the respective channels for implementing 5.1ch surround, processing of adding a prescribed sound field feature, processing of converting a digital signal to an analog signal or the like on the audio data obtained by the HDMI receiving unit 302a. The audio amplification circuit 308 amplifies audio signals of the respective channels that are output from the audio processing circuit 307 and outputs the signals to the audio output terminals 309a to 309f.

The audio processing circuit 307 further supplies the audio data obtained by the HDMI receiving unit 302a to the HDMI transmitting unit 302b after performing necessary processing. The video and graphics processing circuit 305 performs image conversion, superimposition of graphics data and so on as appropriate on the video (image) data obtained by the HDMI receiving unit 302a and supplies the data to the HDMI transmitting unit 302b.

The CPU 313 controls the operation of each unit of the AV amplifier 300. The flash ROM 314 stores control software and data. The DRAM 315 forms a work area of the CPU 313. The CPU 313 expands the software and data read from the flash ROM 314 in the DRAM 315 and starts the software, thereby controlling each unit of the AV amplifier 300. The CPU 313, the flash ROM 314 and the DRAM 315 are connected to the internal bus 312.

The operation of the AV amplifier 300 shown in FIG. 29 is briefly described.

In the HDMI receiving unit 302a, video (image) data and audio data transmitted from the disc player 400 that is connected to the HDMI terminal 301a through the HDMI cable 351 are acquired. The video data and the audio data are supplied to the HDMI transmitting unit 302b via the video and graphics processing circuit 305 and the audio processing circuit 307, respectively, and transmitted from the HDMI terminal 301b to the TV set 250 through the HDMI cable 352. The AV amplifier 300 thereby exerts a repeater function.

When outputting a sound via the AV amplifier 300, the audio processing circuit 307 performs necessary processing such as processing of generating audio data of the respective channels for implementing 5.1ch surround, processing of adding a prescribed sound field feature and processing of converting a digital signal to an analog signal on the audio data obtained by the HDMI receiving unit 302a. The audio signals of the respective channels are then amplified by the audio amplification circuit 308 and output to the audio output terminals 309a to 309f.

In the AV system 200A shown in FIG. 27, the disc player 400 acquires the contents of E-EDID of the TV set 250 via the AV amplifier 300. The disc player 400 thereby acquires information about a format (resolution, frame rate, aspect etc.) of image data with which the TV set 250 is compatible and information related to a screen size.

Therefore, in the AV system 200A shown in FIG. 27, the disc player 400 can correct reproduced stereoscopic image data according to the screen size by the video signal processing circuit 407. The disc player 400 can then transmit the corrected stereoscopic image data to the TV set 250 via the AV amplifier 300.

Consequently, the same advantage as in the AV system 200 shown in FIG. 1 can be obtained also in the AV system 200A shown in FIG. 27. Specifically, stereoscopic image display suited for a screen size is possible in the TV set 250 without increasing user's workload.

Note that, in the AV system 200A shown in FIG. 27, the video and graphics processing circuit 305 of the AV amplifier 300, for example, may be provided with the function similar to that of the rendering processing unit 224 of the game machine 210 described earlier. In this case, it is possible to correct the reproduced stereoscopic image data (before correction) transmitted from the disc player 400 into the stereoscopic image data suited for the screen size of the TV set 250 in the video and graphics processing circuit 305 and then transmit the corrected stereoscopic image data to the TV set 250, for example.

It should be understood by those skilled in the art that various modifications, combinations, sub-combinations and alterations may occur depending on design requirements and other factors insofar as they are within the scope of the appended claims or the equivalents thereof.

In the above-described embodiment, the system using the HDMI transmission path is shown by way of illustration. However, the present invention is equally applicable to a system using a digital visual interface (DVI), a display port (DP) interface, a wireless transmission, a gigabit Ethernet optical fiber transmission path expected to become common in the future and so on, for example.

For example, in the case of the DVI, the standard that stores a compatible image format (resolution, frame rate etc.) of a video signal into an area called E-EDID included in a receiving apparatus is defined, just like the above-described HDMI.

Therefore, in the case of the DVI, a transmitting apparatus can acquire the above-described compatible image format information, information related to a screen size and so on from the E-EDID in the receiving apparatus over a display data channel (DDC), in the same manner as in the case of the above-described HDMI. Therefore, the transmitting apparatus can generate stereoscopic image data suited for the screen size of the receiving apparatus or correct the existing stereoscopic image data to be suited for the screen size of the receiving apparatus.

Further, in the above-described embodiment, the system is shown in which information related to a screen size is described in the E-EDID in the TV set 250, and the TV set 250 or the like (which includes the disc player 400 and the AV amplifier 300 in addition to the TV set 250) obtains the information related to the screen size of the TV set 250 by reading the E-EDID.

However, the way that the game machine 210 or the like acquires information related to the screen size of the TV set 250 is not limited thereto. For example, the game machine 210 or the like may acquire information related to the screen size of the TV set 250 by performing communication between the game machine 210 or the like and the TV set 250 by using a CEC line, which is a control data line of the HDMI cable, for example.

Further, the disc player 400, rather than the game machine 210 or the like, may acquire information related to the screen size of the TV set 250 by performing communication over a two-way communication channel made up of a predetermined line (e.g. reserve line, HPD line etc.) of the HDMI cable described above, for example.

Furthermore, in the above-described embodiment, the case where the transmitting apparatus is the game machine 210 or the disc player 400 and the receiving apparatus is the TV set 250 is shown by way of illustration. However, the transmitting apparatus and the receiving apparatus are not limited thereto. For example, the transmitting apparatus may be a DVD recorder, a set-top box or another AV source, instead of the game machine 210. Further, the receiving apparatus may be a projector, a PC monitor or another display, instead of the TV set 250.

The present invention is applicable to an AV system that enables appropriate stereoscopic image display suited for a screen size without increasing user's workload and that provides a viewer with a stereoscopic image by transmitting stereoscopic image data from a transmitting apparatus and displaying a left-eye image and a right-eye image in a receiving apparatus.

What is claimed is:

1. A transmitting apparatus comprising:
    an image data output unit that outputs stereoscopic image data including left-eye image data and right-eye image data for displaying a stereoscopic image;
    a data transmitting unit that transmits the stereoscopic image data output from the image data output unit to an external device through a transmission path; and
    an information acquisition unit that acquires information related to a screen size from the external device through the transmission path,
    wherein
        a visual distance is determined according to one of (i) a user setting the visual distance and (ii) automatically setting the visual distance based on the screen size,
        an angle of view is computed based on the visual distance and an interpupillary distance,
        wherein the angle of view is computed for one pupil by calculating a first partial angle of view corresponding to a first portion of the screen based in part by subtracting the interpupillary distance from the screen size, calculating a second partial angle of view corresponding to an adjacent second portion of the screen based in part by adding the interpupillary distance to the screen size, and adding the first partial angle of view to the second partial angle of view, and
        the image data output unit outputs the stereoscopic image data suited for the screen size, the visual distance, and the angle of view.

2. The transmitting apparatus according to claim 1, wherein
    the image data output unit uses recommended visual distance information obtained based on the screen size as the visual distance information.

3. The transmitting apparatus according to claim 2, further comprising:
    an adjustment unit for a user to adjust the screen size and the visual distance by using the screen size and the recommended visual distance as default values.

4. The transmitting apparatus according to claim 1, wherein
    when the information acquired by the information acquisition unit indicates that the screen size is sufficiently large, the image data output unit outputs the stereoscopic image data suited for a case where the screen size is sufficiently large.

5. The transmitting apparatus according to claim 1, wherein
    the image data output unit dynamically generates the stereoscopic image data based on the screen size information and outputs the stereoscopic image data.

6. The transmitting apparatus according to claim 1, wherein
    the image data output unit estimates depth information based on existing stereoscopic image data, corrects the existing stereoscopic image data based on the estimated depth information and the screen size information and outputs the stereoscopic image data.

7. The transmitting apparatus according to claim 1, wherein
    the information acquisition unit acquires information related to the screen size by reading the information from a storage unit included in the external device.

8. The transmitting apparatus according to claim 1, wherein
    the data transmitting unit transmits the stereoscopic image data to the external device through the transmission path by differential signals over a plurality of channels.

9. The transmitting apparatus according to claim 8, wherein
    the information acquisition unit acquires information related to the screen size from the external device through a control data line making up the transmission path.

10. The transmitting apparatus according to claim 8, wherein
    the information acquisition unit acquires information related to the screen size through a two-way communication path made up of a predetermined line of the transmission path.

11. The transmitting apparatus according to claim 10, wherein
    the two-way communication path is a pair of differential transmission paths, and at least one of the pair of differential transmission paths has a function of notifying a connection state of the external device with a direct-current bias potential.

12. A stereoscopic image data transmitting method comprising the steps of:
    outputting stereoscopic image data including left-eye image data and right-eye image data for displaying a stereoscopic image;
    transmitting the stereoscopic image data output in the step of outputting stereoscopic image data to an external device through a transmission path; and
    acquiring information related to a screen size from the external device through the transmission path,
    wherein
        a visual distance is determined according to one of (i) a user setting the visual distance and (ii) automatically setting the visual distance based on the screen size,
        an angle of view is computed based on the visual distance and an interpupillary distance,
        wherein the angle of view is computed for one pupil by calculating a first partial angle of view corresponding to a first portion of the screen based in part by subtracting the interpupillary distance from the screen size, calculating a second partial angle of view corresponding to an adjacent second portion of the screen based in part by adding the interpupillary distance to the screen size, and adding the first partial angle of view to the second partial angle of view, and
        the step of outputting stereoscopic image data outputs the stereoscopic image data suited for the screen size, the visual distance, and the angle of view.

13. A receiving apparatus comprising:
a data receiving unit that receives stereoscopic image data including left-eye image data and right-eye image data for displaying a stereoscopic image from an external device through a transmission path;
a data processing unit that processes the stereoscopic image data received by the data receiving unit and obtains the left-eye image data and the right-eye image data; and
an information supply unit that supplies information related to a screen size to the external device through the transmission path,
wherein
a visual distance is determined according to one of (i) a user setting the visual distance and (ii) automatically setting the visual distance based on the screen size,
an angle of view is computed based on the visual distance and an interpupillary distance,
wherein the angle of view is computed for one pupil by calculating a first partial angle of view corresponding to a first portion of the screen based in part by subtracting the interpupillary distance from the screen size, calculating a second partial angle of view corresponding to an adjacent second portion of the screen based in part by adding the interpupillary distance to the screen size, and adding the first partial angle of view to the second partial angle of view, and
the data receiving unit receives stereoscopic image data suited for the screen size, the visual distance, and the angle of view.

14. The receiving apparatus according to claim 13, wherein when the screen size is sufficiently large, the information supply unit supplies information indicating that the screen size is sufficiently large as the information related to the screen size.

15. The receiving apparatus according to claim 13, wherein the data receiving unit receives the stereoscopic image data from the external device through the transmission path by differential signals over a plurality of channels.

16. A stereoscopic image data receiving method comprising the steps of:
receiving stereoscopic image data including left-eye image data and right-eye image data for displaying a stereoscopic image from an external device through a transmission path;
processing the stereoscopic image data received in the step of receiving stereoscopic image data and obtaining the left-eye image data and the right-eye image data; and
supplying information related to a screen size to the external device through the transmission path,
wherein
a visual distance is determined according to one of (i) a user setting the visual distance and (ii) automatically setting the visual distance based on the screen size,
an angle of view is computed based on the visual distance and an interpupillary distance,
wherein the angle of view is computed for one pupil by calculating a first partial angle of view corresponding to a first portion of the screen based in part by subtracting the interpupillary distance from the screen size, calculating a second partial angle of view corresponding to an adjacent second portion of the screen based in part by adding the interpupillary distance to the screen size, and adding the first partial angle of view to the second partial angle of view, and
the step of receiving stereoscopic image data receives stereoscopic image data suited for the screen size, the visual distance, and the angle view.

\* \* \* \* \*